United States Patent
Huang et al.

(10) Patent No.: US 11,522,789 B2
(45) Date of Patent: Dec. 6, 2022

(54) DATA PROCESSING METHOD, APPARATUS, AND SYSTEM FOR COMBINING DATA FOR A DISTRIBUTED CALCULATION TASK IN A DATA CENTER NETWORK

(71) Applicant: Huawei Technologies Co., Ltd., Shenzhen (CN)

(72) Inventors: Yi Huang, Beijing (CN); Yinben Xia, Beijing (CN); Mengzhu Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 30 days.

(21) Appl. No.: 17/012,941

(22) Filed: Sep. 4, 2020

(65) Prior Publication Data
US 2020/0403904 A1    Dec. 24, 2020

Related U.S. Application Data

(63) Continuation of application No. PCT/CN2019/074052, filed on Jan. 31, 2019.

(30) Foreign Application Priority Data

Mar. 5, 2018 (CN) .......................... 201810178287.5

(51) Int. Cl.
*H04L 45/00* (2022.01)
*G06N 3/08* (2006.01)
(Continued)

(52) U.S. Cl.
CPC .............. *H04L 45/20* (2013.01); *G06N 3/08* (2013.01); *H04L 45/025* (2013.01);
(Continued)

(58) Field of Classification Search
None
See application file for complete search history.

(56) References Cited

U.S. PATENT DOCUMENTS

| 9,721,214 B1 | 8/2017 | Corrado et al. |
| 2004/0100980 A1 | 5/2004 | Jacobs et al. |

(Continued)

FOREIGN PATENT DOCUMENTS

| CN | 1717669 A | 1/2006 |
| CN | 103106253 A | 5/2013 |

(Continued)

OTHER PUBLICATIONS

Jamalian, S., et al, "Data-Intensive HPC Tasks Scheduling with SDN to Enable HPC-as-a-Service," IEEE 8th International Conference on Cloud Computing, XP33207524A, 2015, 8 pages.

(Continued)

*Primary Examiner* — Anh Ngoc M Nguyen
(74) *Attorney, Agent, or Firm* — Conley Rose, P.C.

(57) ABSTRACT

A data processing method implemented by a controller includes after receiving a processing request from a specified node carrying identifiers of a plurality of computing nodes configured to execute a specified calculation task, determining a target switching device from switching devices that are configured to connect to the plurality of computing nodes, and separately sending, to the target switching device and the specified node, routing information used to indicate data forwarding paths between the plurality of computing nodes and the target switching device. The target switching device is configured to combine, based on the routing information, data reported by the plurality of computing nodes, and then send combined data to each computing node. The specified node is configured to send the routing information to each computing node, and each (Continued)

computing node may report data to the target switching device based on the routing information.

20 Claims, 10 Drawing Sheets

(51) Int. Cl.
  *H04L 45/02* (2022.01)
  *H04L 45/12* (2022.01)
  *H04L 45/74* (2022.01)
  *H04L 47/12* (2022.01)
  *H04L 47/41* (2022.01)
(52) U.S. Cl.
  CPC ............ *H04L 45/127* (2013.01); *H04L 45/74* (2013.01); *H04L 47/12* (2013.01); *H04L 47/41* (2013.01)

(56) References Cited

U.S. PATENT DOCUMENTS

| | | | |
|---|---|---|---|
| 2009/0092112 A1 | 4/2009 | Kim et al. | |
| 2012/0218893 A1* | 8/2012 | Natarajan | H04L 41/12 370/235 |
| 2013/0144973 A1 | 6/2013 | Li et al. | |
| 2013/0294236 A1 | 11/2013 | Beheshti-Zavareh et al. | |
| 2014/0289745 A1 | 9/2014 | Nirantar | |
| 2015/0092570 A1 | 4/2015 | Iwata et al. | |
| 2015/0363465 A1 | 12/2015 | Bordawekar et al. | |
| 2016/0080272 A1 | 3/2016 | McNaughton et al. | |
| 2016/0140012 A1* | 5/2016 | Hsu | H04L 69/40 702/186 |
| 2017/0109207 A1 | 4/2017 | Li et al. | |
| 2018/0103119 A1* | 4/2018 | Pham | H04L 63/0876 |

FOREIGN PATENT DOCUMENTS

| | | |
|---|---|---|
| CN | 103139265 A | 6/2013 |
| CN | 103366015 A | 10/2013 |
| CN | 104023039 A | 9/2014 |
| CN | 104113477 A | 10/2014 |
| CN | 104272653 A | 1/2015 |
| CN | 104378161 A | 2/2015 |
| CN | 104935458 A | 9/2015 |
| CN | 105357124 A | 2/2016 |
| CN | 105446979 A | 3/2016 |
| CN | 105634938 A | 6/2016 |
| CN | 106302182 A | 1/2017 |
| CN | 106326308 A | 1/2017 |
| CN | 106961387 A | 7/2017 |
| CN | 107094115 A | 8/2017 |
| CN | 107291847 A | 10/2017 |
| CN | 105339934 B | 10/2018 |
| WO | 2015173759 A1 | 11/2015 |

OTHER PUBLICATIONS

"MapReduce—Wikipedia," Oct. 5, 2014, XP055470215, 14 pages.

* cited by examiner

DATA PROCESSING METHOD, APPARATUS, AND SYSTEM FOR COMBINING DATA FOR A DISTRIBUTED CALCULATION TASK IN A DATA CENTER NETWORK

CROSS-REFERENCE TO RELATED APPLICATIONS

This application is a continuation of International Patent Application No. PCT/CN2019/074052 filed on Jan. 31, 2019, which claims priority to Chinese Patent Application No. 201810178287.5 filed on Mar. 5, 2018. The disclosures of the aforementioned applications are hereby incorporated by reference in their entireties.

TECHNICAL FIELD

This application relates to the field of distributed computing, and in particular, to a data processing method, apparatus and system.

BACKGROUND

In distributed machine learning, model training is usually performed in a data parallel manner. When model training is performed in the data parallel manner, each computing node (or a worker) stores an algorithm model, and each node may separately obtain some of sample data, and can obtain a model parameter by training the obtained sample data. Each computing node needs to send the model parameter obtained through calculation to a parameter server. The parameter server is configured to aggregate and update model parameters reported by computing nodes, and then send the updated model parameters to each computing node.

In the related art, a high-performance computing (HPC) data center network is usually used to implement distributed machine learning. Further, one server may be selected as a parameter server, another server may be selected as a master node, and a plurality of other servers may be selected as computing nodes. The master node is configured to deliver a network address of the parameter server to the plurality of computing nodes, and drive the plurality of computing nodes to execute a distributed machine learning task. In the HPC data center network, the parameter server may exchange data with the computing nodes using switching devices, to report model parameters and deliver updated model parameters.

However, in such a distributed machine learning process, a volume of data transmitted in the data center network is relatively large, and network congestion may occur. Consequently, a data transmission delay between a computing node and the parameter server is relatively large, and efficiency of distributed machine learning is affected.

SUMMARY

This application provides a data processing method, apparatus, and system, to resolve a problem in the related art that when distributed computing is implemented in a data center network, due to a relatively large volume of data transmitted in the network, congestion may occur, and computing efficiency is affected. The following describes the technical solutions.

According to a first aspect, a data processing method is provided. The method is applied to a controller in a data center network, and may include receiving, by a controller, a processing request that is for a specified calculation task and that is sent by a specified node, where the processing request includes identifiers of a plurality of computing nodes configured to execute the specified calculation task, then determining, by the controller, a target switching device from switching devices configured to connect to the plurality of computing nodes, and separately sending, by the controller, routing information corresponding to the specified calculation task to the target switching device and the specified node, where the routing information is used to indicate data forwarding paths between the plurality of computing nodes and the target switching device.

The routing information is used for the target switching device to send, after the target switching device combines data reported by the plurality of computing nodes, the combined data to each computing node based on the routing information. That is, based on the routing information, the target switching device may combine data reported by the plurality of computing nodes, and then send combined data to each computing node. In addition, after receiving the routing information, the specified node may send the routing information to each computing node other than the specified node among the plurality of computing nodes, and each computing node may report data to the target switching device based on the routing information.

In the method provided in this application, because the controller may select the target switching device to combine the data reported by the plurality of computing nodes, the computing nodes do not need to send data to a parameter server using switching devices, and the parameter server does not need to feed a combining result back to the computing nodes using the switching devices such that a volume of data transmitted in the data center network is effectively reduced, and a probability of network congestion and a data transmission delay are reduced, thereby improving efficiency of executing the calculation task.

Optionally, the data forwarding paths between the plurality of computing nodes and the target switching device may include at least one switching device, and the method may further include determining, from the at least one switching device included in the data forwarding paths, a switching device connected to at least two computing nodes among the plurality of computing nodes as an intermediate switching device, and sending the routing information to the intermediate switching device, where the routing information is used for the intermediate switching device to send, after the intermediate switching device combines data reported by the at least two computing nodes connected to the intermediate switching device, combined data to the target switching device based on the routing information.

In a process in which the computing nodes report data to the target switching device, the data reported by the at least two computing nodes is combined and then sent using the intermediate switching device. As compared with directly forwarding the data by the intermediate switching device, using this process, the volume of the data transmitted in the network can further be reduced, and the probability of the network congestion can further be reduced.

Optionally, a process of separately sending, by the controller, the routing information corresponding to the specified calculation task to the target switching device and the specified node may include sending routing information that includes an identifier of a directly connected device of the target switching device to the target switching device, where the directly connected device of the target switching device is a computing node or an intermediate switching device, and sending routing information that includes an identifier of a directly connected device of each computing node to the specified node, where the directly connected device of the computing node is the target switching device or an intermediate switching device, and the specified node is configured to send the identifier of the directly connected device of the computing node to the corresponding computing node.

Correspondingly, a process of sending, by the controller, the routing information to the intermediate switching device may include sending routing information that includes an identifier of a directly connected device of the intermediate switching device to the intermediate switching device, where the directly connected device of the intermediate switching device is a computing node, the target switching device, or another intermediate switching device.

An identifier of each device may be an Internet Protocol (IP) address of the device.

The routing information sent by the controller to each device may include only an identifier of a directly connected device of the device such that a data volume of the routing information can further be reduced while normal data forwarding is ensured, and efficiency of transmitting the routing information is effectively improved.

Optionally, a process of determining, by the controller, the target switching device from the switching devices configured to connect to the plurality of computing nodes may include separately calculating a sum of router hop counts between computing nodes and each switching device among the switching devices configured to connect to the plurality of computing nodes, and determining a switching device corresponding to a minimum sum of router hop counts as the target switching device.

In this embodiment of the present disclosure, the switching device corresponding to the minimum sum of the router hop counts is selected as the target switching device such that it can be ensured that a total path between the selected target switching device and the computing nodes is relatively short, the volume of the data transmitted in the network can be effectively reduced, and the probability of the network congestion can further be reduced.

In an optional implementation, a process of determining, by the controller, the switching device corresponding to the minimum sum of the router hop counts as the target switching device may include, when there are a plurality of switching devices corresponding to minimum sums of router hop counts, separately determining a performance parameter of each switching device corresponding to a minimum sum of router hop counts, where the performance parameter includes at least one of available bandwidth, a throughput, computing load, and a quantity of times for which the switching device is selected as the target switching device, and determining, from the plurality of switching devices corresponding to the minimum sums of the router hop counts, a switching device having a performance parameter that meets a preset condition as the target switching device.

Selecting the target switching device based on performance parameters of the switching devices can ensure that the selected target switching device has relatively good performance and can ensure relatively high computing efficiency.

In another optional implementation, a process of determining, by the controller, the switching device corresponding to the minimum sum of the router hop counts as the target switching device may include, when there are a plurality of switching devices corresponding to minimum sums of router hop counts, separately determining balance degrees of router hop counts between each switching device corresponding to a minimum sum of router hop counts and the computing nodes, and determining, from the plurality of switching devices corresponding to the minimum sums of the router hop counts, a switching device corresponding to a highest balance degree of router hop counts as the target switching device.

Selecting the target switching device based on the balance degrees of the router hop counts can ensure that path lengths between the selected target switching device and the computing nodes are relatively balanced, and can further ensure that required duration in which the computing nodes report data is relatively close such that the target switching device can receive, in a relatively short time, data reported by all computing nodes, and combine the data, and the efficiency of executing the calculation task is further improved.

Optionally, before calculating a sum of router hop counts between each switching device and all computing nodes, the controller may further first detect whether the plurality of computing nodes are all directly connected to a same switching device, and when the plurality of computing nodes are all directly connected to a same switching device, the controller does not need to calculate the sum of the router hop counts between the switching device and the computing nodes, but may directly determine the switching device directly connected to the plurality of computing nodes as the target switching device, to improve efficiency of determining the target switching device, and when the plurality of computing nodes are directly connected to different switching devices, the controller then calculates a sum of router hop counts between each switching device and the computing nodes.

Optionally, the method may further include receiving topology information reported by each switching device in the data center network, and determining a topology structure between the plurality of computing nodes based on received topology information, and correspondingly, when determining a switching device that has connection relationships with the computing nodes, determining, by the controller, the switching device based on the topology structure.

Optionally, when determining the target switching device from switching devices that have connection relationships with the plurality of computing nodes, the controller may further first determine at least one alternative switching device from the switching devices configured to connect to the plurality of computing nodes, where each alternative switching device can be connected to at least two computing nodes using downlink paths, the controller then may determine the target switching device from the at least one alternative switching device.

Optionally, when determining the target switching device, the controller may further first determine at least one alternative switching device from the switching devices configured to connect to the plurality of computing nodes, where each alternative switching device can be connected to at least two computing nodes among the plurality of computing nodes using downlink paths, the controller then may determine the target switching device from the at least one alternative switching device.

Optionally, the processing request sent by the specified node may further include a combining type corresponding to the specified calculation task. Correspondingly, the method may further include sending the combining type corresponding to the specified calculation task to the target switching device, where the target switching device is configured to combine, based on the combining type, the data reported by the plurality of computing nodes.

Because different calculation tasks may be corresponding to different combining types, received data is combined based on the combining type corresponding to the specified calculation task such that data processing precision can be ensured.

According to a second aspect, another data processing method is provided. The method is applied to a switching device in a data center network, and may include receiving routing information that is corresponding to a specified calculation task and that is sent by a controller, where the routing information is used to indicate data forwarding paths between a plurality of computing nodes and a target switching device, and the plurality of computing nodes are configured to execute the specified calculation task, further combining, by the switching device, data reported by the plurality of computing nodes, and sending combined data based on the routing information. The routing information is sent by the controller after the controller receives a processing request that is for the specified calculation task and that is sent by a specified node, and determines the target switching device from switching devices configured to connect to the plurality of computing nodes.

In the method provided in this application, because the switching device may combine the data reported by the plurality of computing nodes and send combined data, the computing nodes do not need to send data to a parameter server using switching devices, and the parameter server does not need to feed a combining result back to the computing nodes using the switching devices such that a volume of data transmitted in the data center network is effectively reduced, and a probability of network congestion and a data transmission delay are reduced, thereby improving efficiency of executing the calculation task.

Optionally, before combining the data reported by the plurality of computing nodes, the switching device may further receive a combining type that is corresponding to the specified calculation task and that is sent by the controller, and correspondingly, a process of combining, by the switching device, the data reported by the plurality of computing nodes may include combining, based on the combining type, the data reported by the plurality of computing nodes.

Optionally, the switching device may be the target switching device, and in this case, a process of sending, by the target switching device, the combined data based on the routing information may include sending the combined data to each computing node based on the routing information.

Optionally, the switching device may be an intermediate switching device configured to connect to the target switching device and at least two computing nodes, in this case, a process of combining, by the intermediate switching device, the data reported by the plurality of computing nodes may include combining the data reported by the at least two computing nodes, and correspondingly, a process of sending, by the intermediate switching device, the combined data based on the routing information may include sending the combined data to the target switching device based on the routing information.

According to a third aspect, a data processing apparatus is provided. The apparatus is applied to a controller in a data center network, and may include at least one module. The at least one module is configured to implement the data processing method according to the foregoing first aspect.

According to a fourth aspect, a data processing apparatus is provided. The apparatus is applied to a switching device in a data center network, and may include at least one module. The at least one module is configured to implement the data processing method according to the foregoing second aspect.

According to a fifth aspect, a controller is provided. The controller may include a processor, a memory, and a communications interface. The memory stores a computer program run by the processor. The processor, the memory, and the communications interface may be configured to implement the data processing method according to the foregoing first aspect.

According to a sixth aspect, a switching device is provided. The switching device includes a switching chip, a processor, and a memory. The switching chip, the processor, and the memory may be configured to implement the data processing method according to the foregoing second aspect.

According to a seventh aspect, a data processing system is provided. The system may include a controller, a plurality of computing nodes, and at least one switching device. The controller may include the data processing apparatus described in the third aspect, or may be the controller described in the fifth aspect. Each switching device may include the data processing apparatus described in the fourth aspect, or may be the switching device described in the seventh aspect.

According to an eighth aspect, a computer-readable storage medium is provided. The computer-readable storage medium stores an instruction. When the computer-readable storage medium is run on a computer, the computer is enabled to perform the data processing method according to the foregoing first or second aspect.

According to a ninth aspect, a computer program product including an instruction is provided, and when the computer program product is run on a computer, the computer is enabled to perform the data processing method according to the foregoing first or second aspect.

In conclusion, this application provides a data processing method, apparatus, and system. The processing request that is for the specified calculation task and that is sent by the specified node to the controller includes the identifiers of the plurality of computing nodes configured to execute the specified calculation task. After receiving the processing request, the controller may determine the target switching device from the switching devices configured to connect to the plurality of computing nodes, and separately send, to the target switching device and the specified node, the routing information used to indicate the data forwarding paths between the plurality of computing nodes and the target switching device such that each computing node may report data to the target switching device based on the routing information, and the target switching device may combine, based on the routing information, the data reported by the plurality of computing nodes, and then send the combined data to each computing node. Therefore, using the methods according to this application, the computing nodes do not need to send the data to the parameter server using the switching devices, and the parameter server does not need to feed the combining result back to the computing nodes using the switching devices such that the volume of the data transmitted in the data center network is effectively reduced, and the probability of the network congestion and the data transmission delay are reduced, thereby improving the efficiency of executing the calculation task.

DESCRIPTION OF EMBODIMENTS

Figure 1A:
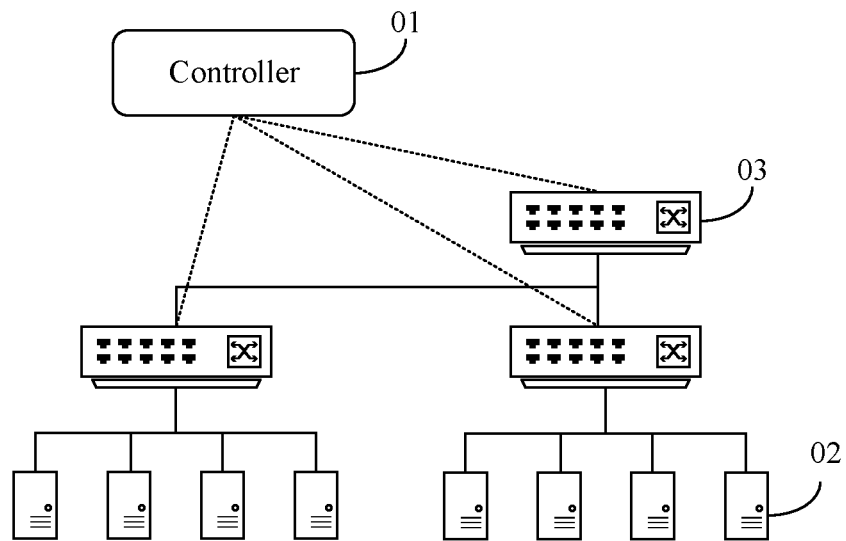
FIG. 1A is an architectural diagram of a data center network in a data processing method according to an embodiment of the present disclosure.

FIG. 1A is an architectural diagram of a data center network in a data processing method according to an embodiment of the present disclosure. As shown in FIG. 1A, the data center network may include a controller 01, a plurality of computing nodes 02, and at least one switching device 03 configured to connect to the plurality of computing nodes 02. The controller 01 and each computing node 02 may be deployed in a server, and the switching device 03 may be a switch having a data forwarding function and a data processing function. Referring to FIG. 1A, it can be learned that a communication connection is established between the controller 01 and each switching device 03, and a communication connection may be established between any two computing nodes 02 using a switching device 03.

In this embodiment of the present disclosure, the plurality of computing nodes 02 may be configured to implement a distributed calculation task such as distributed machine learning. For example, the plurality of computing nodes 02 may implement deep neural network (DNN)-based artificial intelligence (AI) model training. When a distributed calculation task is implemented using several computing nodes among the plurality of computing nodes 02, an algorithm model of the distributed calculation task may be deployed in each computing node among the several computing nodes, and a specified node may be selected from the several computing nodes, or a specified node may be selected from other computing nodes. A driver used to drive the distributed calculation task is deployed in the specified node, and the several computing nodes may be driven by the specified node to concurrently execute the distributed calculation task.

With rapid development of computing hardware, computing performance of a computing node that uses a tensor processing unit (TPU) and a graphics processing unit (GPU) as cores is greatly improved. In this way, a computing time in which computing nodes execute the distributed calculation task is greatly reduced. Therefore, a relatively high requirement is imposed on a communication time in which the computing nodes communicate with a parameter server, and the communication time usually needs to be limited to a millisecond-level time period.

To reduce the communication time in which the computing nodes communicate with the parameter server, in the data center network provided in this embodiment of the present disclosure, a function of the parameter server may be offloaded to a switching device. To be specific, the switching device may combine data reported by the computing nodes, and feed the combined data back to the computing nodes such that a data communication time can be effectively reduced, and efficiency of executing the distributed calculation task can be improved.

Figure 1B:
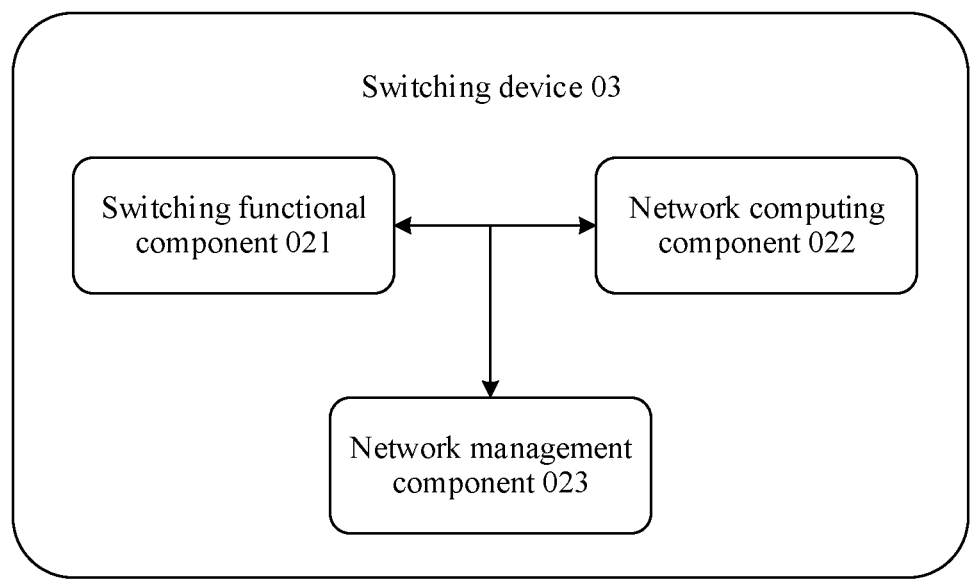
FIG. 1B is an architectural diagram of a switching device according to an embodiment of the present disclosure.

FIG. 1B is an architectural diagram of a switching device according to an embodiment of the present invention. As shown in FIG. 1B, each switching device 03 in a data center network may include a switching functional component 021, a network computing component 022, and a network management component 023. The switching functional component 021 is configured to implement a data forwarding function of a conventional switching device. The network computing component 022 is configured to combine data reported by a plurality of computing nodes 02. The network management component 023 is configured to: be aware of a network topology, store routing information corresponding to different distributed calculation tasks, and instruct, based on the routing information, the switching functional component 021 to forward the data combined by the network computing component 022.

Figure 1C:
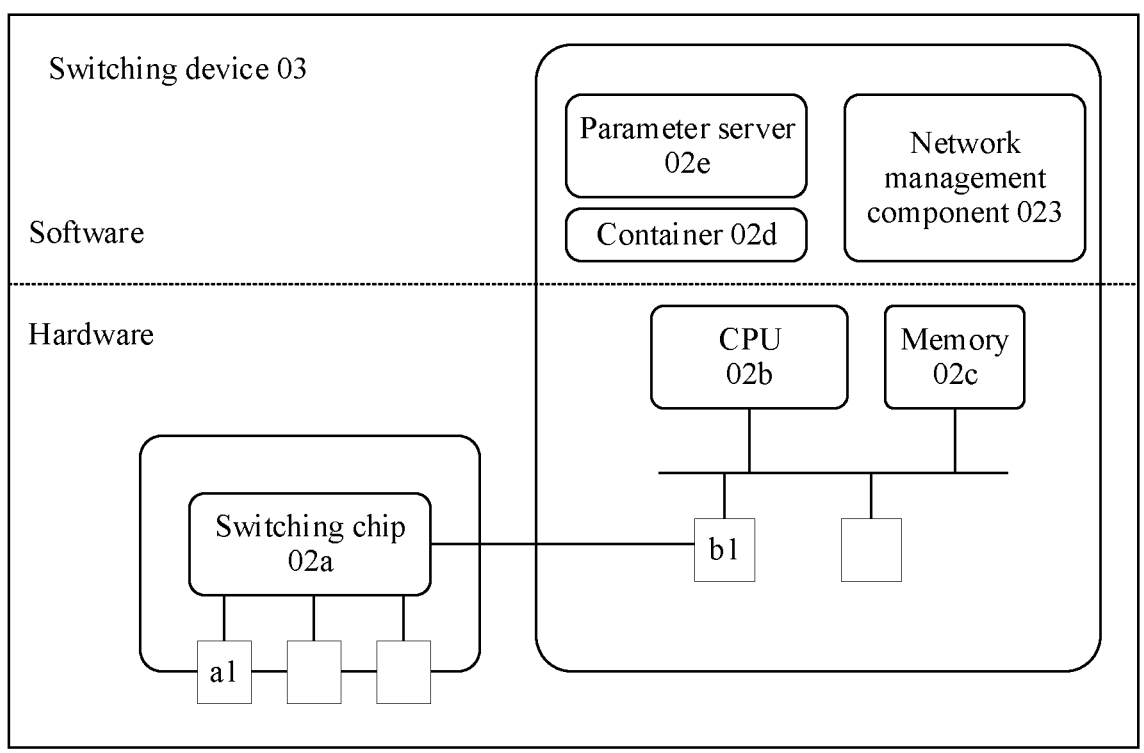
FIG. 1C is an architectural diagram of another switching device according to an embodiment of the present disclosure.

FIG. 1C is an architectural diagram of another switching device according to an embodiment of the present invention. As shown in FIG. 1C, a hardware part of switching device 03 may mainly include a switching chip 02a, a Central Processing Unit (CPU) 02b, and a memory 02c. A software part may include at least one container 02d, a parameter server 02e deployed in each container 02d, and a network management component 023. The parameter server 02e deployed in the container 02d may be an application that can implement a function of the parameter server. The switching chip 02a may be a switching functional component of the switching device 02, and is configured to forward a layer-2 packet or a layer-3 packet. The CPU 02b and the parameter server 02e may be a network computing component of the switching device 02. The CPU may be a CPU based on an x86 instruction set (or an instruction set of another type), and has relatively high computing performance. The CPU is configured to provide a processing requirement of software such as a conventional virtualization container, and is configured to support a data computing function of the parameter server. The parameter server 02e is run on the CPU 02b, and has a data combining (also referred to as aggregating) function required during distributed computing.

In addition, referring to FIG. 1C, the switching chip 02a and the CPU 02b may be connected by using a high-speed interconnect interface b1, and the high-speed interconnect interface b1 may be a Network Interface Card (MC) interface, which can meet high bandwidth and low latency requirements of data transmission during distributed computing. Generally, a network interface card is also referred to as a network adapter. A bandwidth rate at the high-speed interconnect interface b1 may be a plurality of times the bandwidth rate at an external interface a1 of the switching device 03. For example, a unidirectional bandwidth rate of the high-speed interconnect interface b1 may be greater than 40 Gbps (gigabit per second). The high-speed interconnect interface b1 can effectively reduce a probability of network congestion when a plurality of computing nodes or a plurality of switching devices simultaneously report data to one switching device (also referred to as many-to-one).

Figure 1D:
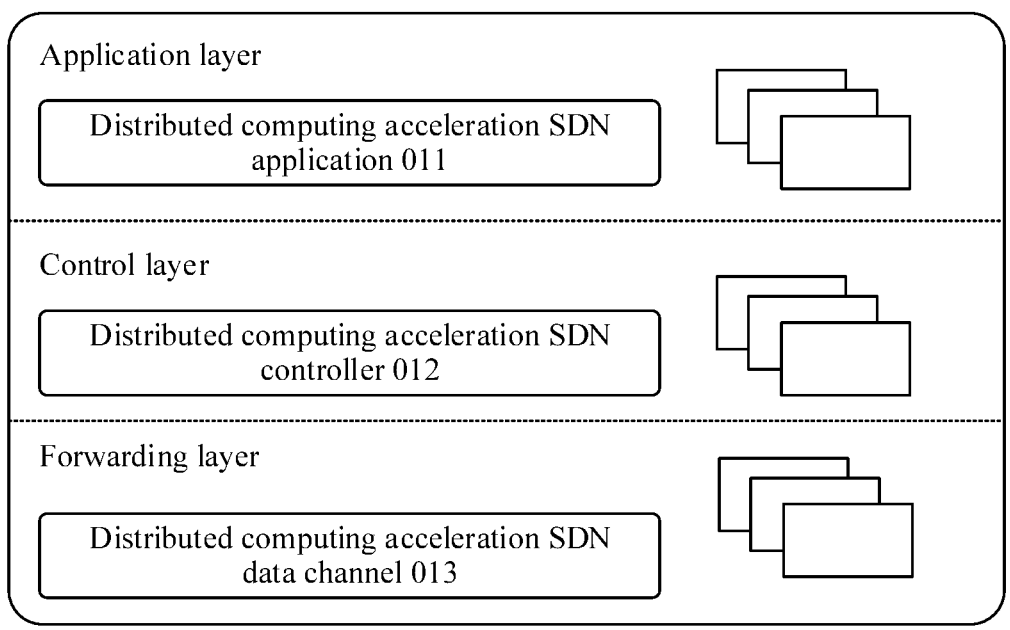
FIG. 1D is an architectural diagram of a controller in a data center network according to an embodiment of the present disclosure.

FIG. 1D is an architectural diagram of a controller in a data center network according to an embodiment of the present disclosure. As shown in FIG. 1D, controller 01 may be a controller based on a software-defined network (SDN) architecture, and the SDN architecture may include an application layer, a control layer, and a forwarding layer. The application layer of the controller 01 includes a distributed computing acceleration SDN application (an acceleration application) 011. The control layer includes a distributed computing acceleration SDN controller (an acceleration controller) 012. The forwarding layer includes a distributed computing acceleration SDN data channel (a data channel) 013.

The acceleration application 011 is mainly configured to interact with a specified node using a network service interface (for example, a representational state transfer (REST) architectural style (RESTful) interface). For example, the acceleration application may receive a processing request sent by the specified node, and may feed routing information (the routing information may include an identifier of a switching device configured to implement a function of a parameter server) determined by the controller back to the specified node. In addition, the acceleration application 011 may further interact with the acceleration controller 012, may provide, to the acceleration controller 012, information such as a combining type and an identifier of a computing node corresponding to a specified calculation task, and may receive the routing information fed back by the acceleration controller 012.

The acceleration controller 012 may be a functional entity that is in the controller 01 and that is configured to implement distributed computing acceleration. The acceleration controller 012 stores a physical topology of the data center network, and may determine, based on the physical topology, routing information used to accelerate the specified distributed calculation task. In addition, the acceleration controller 012 may further obtain performance parameters of all switching devices in the data center network. The performance parameters may include available bandwidth, a throughput, computing load, and the like.

The data channel 013 may be a logical data forwarding channel, and constitute a data forwarding path between the controller and the specified node and data forwarding paths between the controller and the switching devices.

Figure 2A:
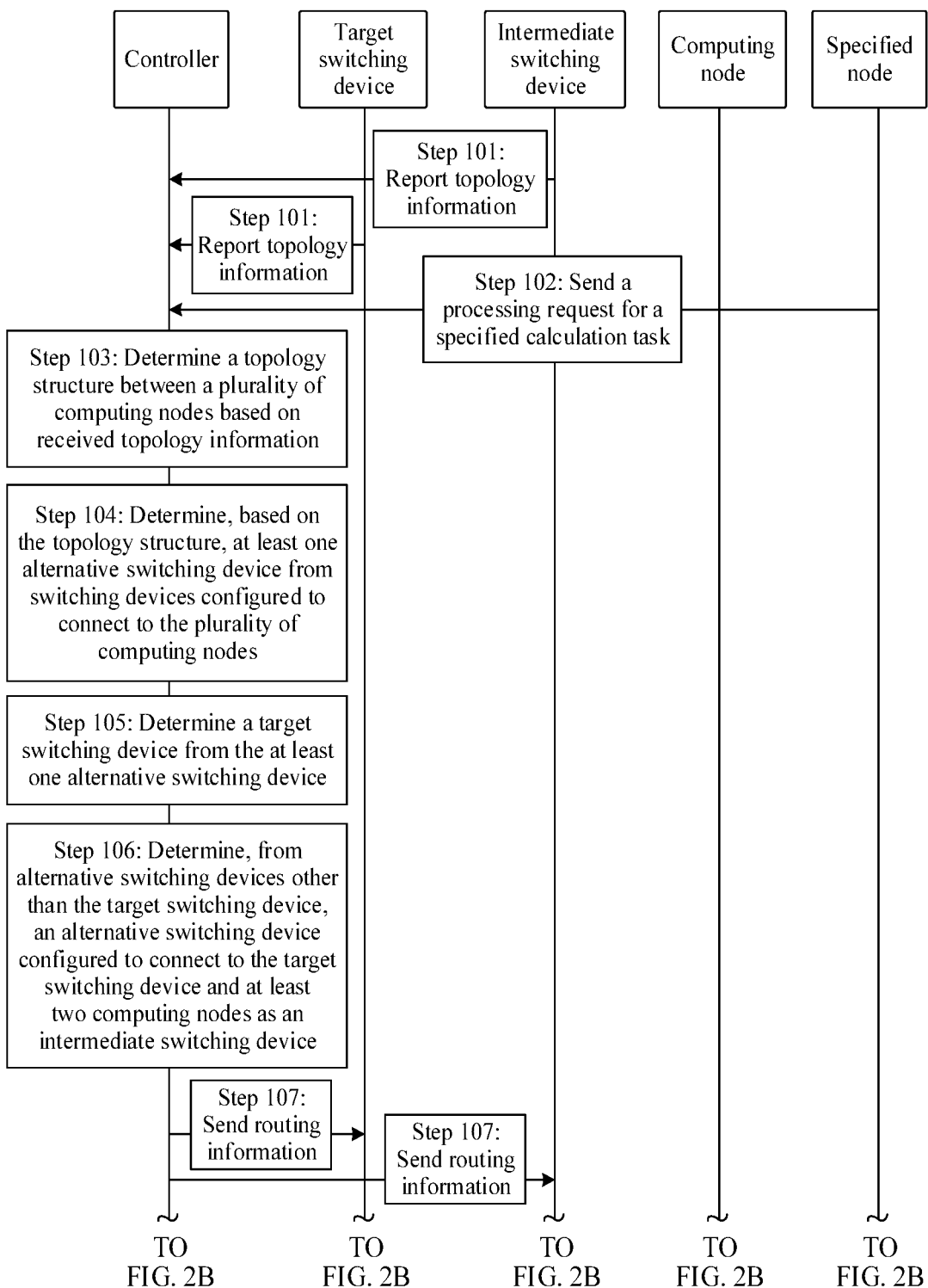
FIG. 2A and FIG. 2B are a flowchart of a data processing method according to an embodiment of the present disclosure.
Figure 2B:
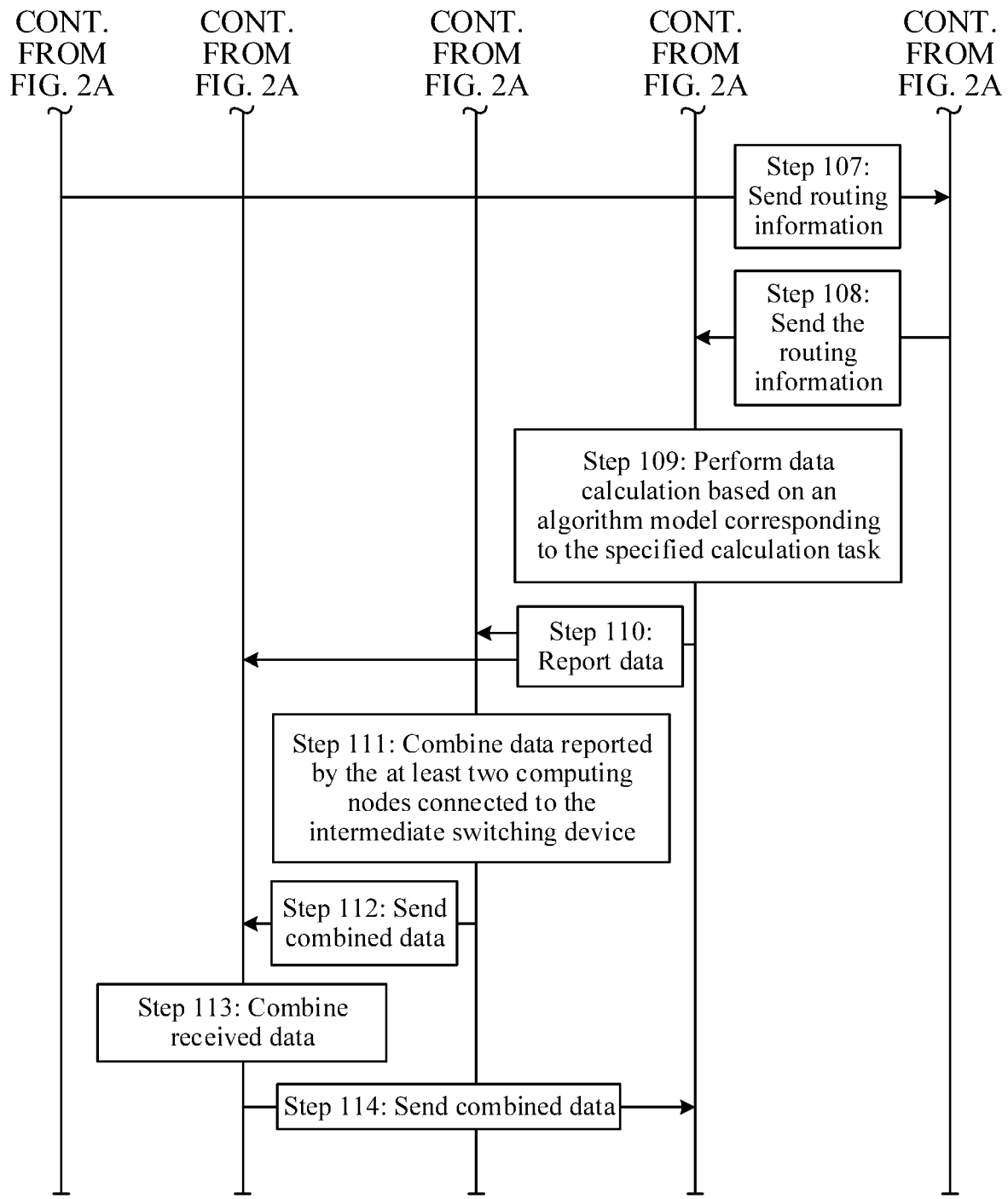

FIG. 2A and FIG. 2B are a flowchart of a data processing method according to an embodiment of the present disclosure. The method may be applied to the data center network shown in FIG. 1A. Referring to FIG. 2A and FIG. 2B, the method may include the following steps.

Step 101: Each switching device reports topology information to a controller.

The topology information reported by the switching device may include an identifier of the switching device and an identifier of a device (for example, a computing node or another switching device) connected to the switching device. The identifier of the device may be a network address of the device, for example, an IP address. In this embodiment of the present disclosure, each switching device in the data center network has a topology aware function. After a topology of the data center network is stable, each switching device may obtain an identifier of a device connected to the switching device, and report the identifier to the controller. FIG. 2A and FIG. 2B show only a target switching device and an intermediate switching device that are selected from a plurality of switching devices included in the data center network. Actually, each switching device in the data center network may report topology information to the controller. After obtaining topology information reported by the switching devices, the controller may determine an overall topology structure of the data center network.

Figure 3:
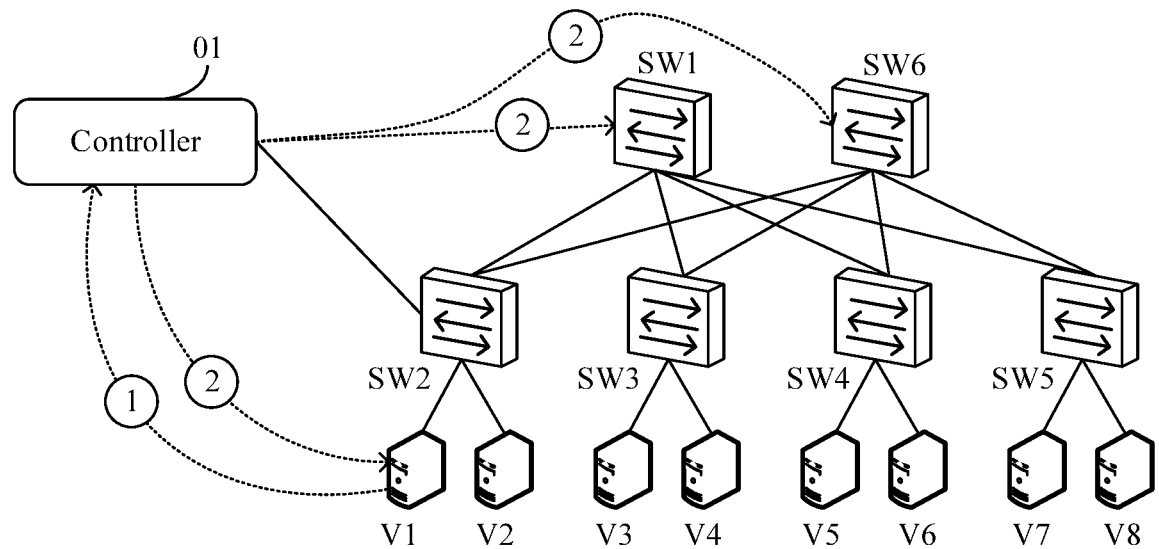
FIG. 3 is an architectural diagram of another data center network according to an embodiment of the present disclosure.

For example, FIG. 3 is an architectural diagram of another data center network according to an embodiment of the present disclosure. As shown in FIG. 3, it is assumed that the data center network includes a controller 01, computing nodes V1 to V8, and switching devices SW1 to SW6. Devices connected to a switching device SW2 include a computing node V1, a computing node V2, a switching device SW1, and a switching device SW6. The switching device SW2 may obtain topology information using a network management component of the switching device SW2, and report the topology information to the controller 01 using the switching functional component of the switching device SW2. The topology information reported by the switching device SW2 to the controller 01 may include an IP address of the switching device SW2, an IP address of the computing node V1, an IP address of the computing node V2, an IP address of the switching device SW1, and an IP address of the switching device SW6.

The controller 01 may determine, based on topology information reported by the switching device SW1 to the switching device SW6, that a topology structure of the data center network is a two-layer leaf-spine topology structure. Switching devices SW2 to SW5 are leafs witching devices (that is, switching devices at the first layer), and the switching device SW1 and the switching device SW6 are spine switching devices (that is, switching devices at the second layer). In addition, two computing nodes are connected to each leaf switching device.

Step 102: A specified node sends a processing request for a specified calculation task to the controller.

The processing request may include identifiers of a plurality of computing nodes configured to execute the specified calculation task, and the specified node is a computing node that is pre-selected from computing nodes included in the data center network and that is configured to drive execution of the specified calculation task. A distributed driver used to drive the plurality of computing nodes to execute the specified calculation task may be deployed in the specified node. In a specific embodiment, the specified node and the plurality of computing nodes configured to execute the specified calculation task are all pre-selected by a developer, and the specified node may be one node among the plurality of computing nodes, or the specified node may be a computing node that is separately disposed. This is not limited in this embodiment of the present disclosure.

For example, it is assumed that the specified calculation task is a distributed AI training task, computing nodes configured to execute the distributed AI training task include the computing node V1, the computing node V2, and a computing node V7, and the specified node is the computing node V1. Referring to a dashed line numbered 1 in FIG. 3, the computing node V1 may send a processing request to the controller 01 using an interface (for example, a RESTful interface) provided by the controller 01. The processing request may include an identifier of the distributed AI training task and a computing node list. The IP address of the computing node V1, the IP address of the computing node V2, and an IP address of the computing node V7 are recorded in the computing node list.

Step 103: The controller determines a topology structure between the plurality of computing nodes based on received topology information.

After receiving the processing request sent by the specified node, the controller 01 may determine, based on the predetermined topology structure of the data center network, the topology structure between the plurality of computing nodes configured to execute the specified calculation task. The topology structure between the plurality of computing nodes may include the plurality of computing nodes and switching devices configured to connect to the plurality of computing nodes.

Generally, for a data center network having a leaf-spine topology structure, a load balancing feature of a spine switching device is considered, to be specific, each spine switching device may be connected to all leaf switching devices in the data center network. Therefore, all spine switching devices in the data center network may be included in the topology structure between the plurality of computing nodes.

For example, based on the predetermined topology structure of the data center network and an IP address of each computing node among the computing node V1, the computing node V2, and the computing node V7, the controller 01 may determine a topology structure between the three computing nodes. For the topology structure between the three computing nodes, refer to FIG. 4. It can be learned from FIG. 4 that the topology structure includes the three computing nodes and all switching devices configured to connect to the three computing nodes. A set of the switching devices configured to connect to the three computing nodes is {SW2, SW5, SW1, SW6}.

Step 104: The controller determines, based on the topology structure, at least one alternative switching device from the switching devices configured to connect to the plurality of computing nodes.

Each alternative switching device may be a switching device that can be connected to at least two computing nodes among the plurality of computing nodes using downlink paths, and the downlink path may include another switching device, or may not include another switching device.

Figure 4:
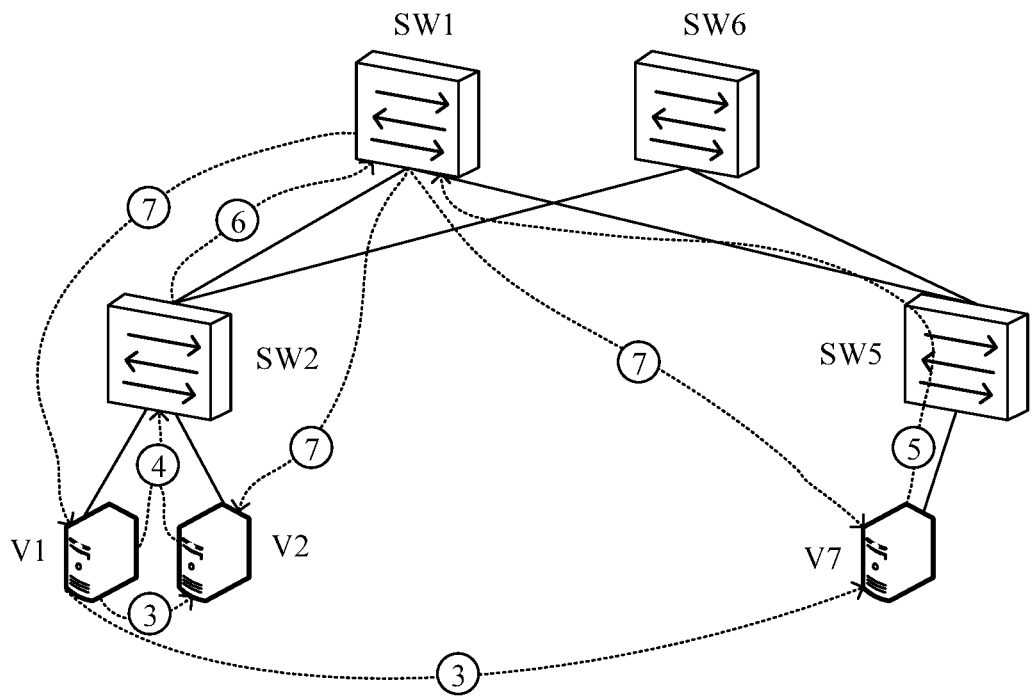
FIG. 4 is a schematic diagram of a topology structure between a plurality of computing nodes according to an embodiment of the present disclosure.

For example, as shown in FIG. 4, it is assumed that the set of the switching devices configured to connect to the computing node V1, the computing node V2, and the computing node V7 is {SW2, SW5, SW1, SW6}. The spine switching device SW1 may be separately connected to the computing node V1, the computing node V2, and the computing node V7 using downlink paths, and the spine switching device SW6 may also be separately connected to the computing node V1, the computing node V2, and the computing node V7 using downlink paths. The leaf switching device SW2 can be connected to the computing node V1 and the computing node V2 using downlink paths, and a leaf switching device SW5 can be connected only to the computing node V7 using a downlink path. Therefore, the controller 01 may determine the switching device SW1, the switching device SW2, and the switching device SW6 as alternative switching devices.

In the method provided in this embodiment of the present disclosure, each switching device has a capability of combining data, and an alternative switching device may be connected to at least two computing nodes using downlink paths. Therefore, data reported by the at least two computing nodes connected to the alternative switching device can be combined and then sent. The target switching device and the intermediate switching device are determined from the alternative switching devices such that it can be ensured that a volume of data transmitted in the network is relatively small when distributed computing is performed.

Step 105: The controller determines the target switching device from the at least one alternative switching device.

Figure 5:
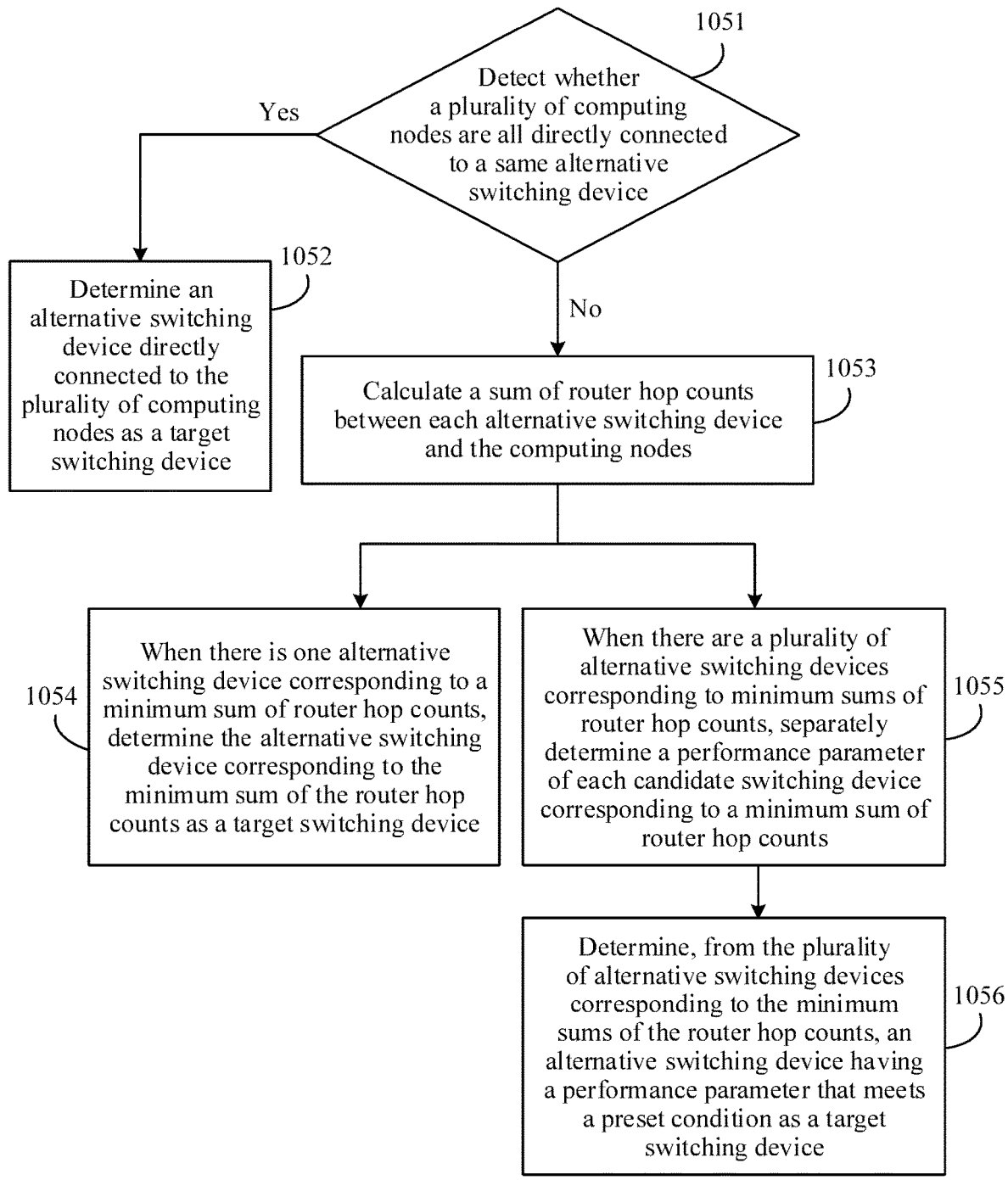
FIG. 5 is a flowchart of a method for determining a target switching device according to an embodiment of the present disclosure.

FIG. 5 is a flowchart of a method for determining a target switching device according to an embodiment of the present disclosure. Referring to FIG. 5, such a process of determining the target switching device may include the following steps.

Step 1051: Detect whether the plurality of computing nodes is all directly connected to a same alternative switching device.

When the plurality of computing nodes is all directly connected to a same alternative switching device, the controller may perform step 1052. When the plurality of computing nodes is directly connected to different alternative switching devices, the controller may perform step 1053.

For example, referring to FIG. 3, assuming that computing nodes configured to execute a specified calculation task include a computing node V3 and a computing node V4, because both the two computing nodes are directly connected to the alternative switching device SW3, the controller 01 may perform step 1052.

Alternatively, as shown in FIG. 4, it is assumed that computing nodes configured to execute a specified calculation task include the computing node V1, the computing node V2, and the computing node V7. Both the computing node V1 and the computing node V2 are directly connected to the alternative switching device SW2, the computing node V7 is connected to the alternative switching device SW1 using the switching device SW5, and alternative switching devices directly connected to the three computing nodes are different alternative switching devices. Therefore, the controller 01 may perform step 1053.

Step 1052: Determine the alternative switching device directly connected to the plurality of computing nodes as the target switching device.

When the plurality of computing nodes is all directly connected to the same alternative switching device, the controller may directly determine the alternative switching device directly connected to the plurality of computing nodes as the target switching device. Referring to FIG. 3, in an example in which the computing nodes include the computing node V3 and the computing node V4, the controller 01 may directly determine the alternative switching device SW3 as the target switching device.

In this embodiment of the present disclosure, when executing the specified calculation task, the plurality of computing nodes may report data obtained through calculation to the target switching device, and the target switching device may combine the data reported by the computing nodes, and separately send combined data to each computing node. Because the target switching device can implement a function of a parameter server, the computing nodes do not need to report the data to the parameter server using switching devices, and the parameter server does not need to deliver the combined data using the switching devices either. Therefore, the volume of the data transmitted in the data center network is effectively reduced, a probability of network congestion and a data transmission delay are reduced, thereby effectively improving efficiency of executing the specified calculation task.

Step 1053: Calculate a sum of router hop counts between each alternative switching device and the computing nodes.

When the plurality of computing nodes is directly connected to different alternative switching devices, the controller may calculate, based on the topology structure between the plurality of computing nodes, a sum of the router hop counts between each alternative switching device and the computing nodes, and determine an alternative switching device corresponding to a minimum sum of router hop counts as the target switching device.

In this embodiment of the present disclosure, when collecting statistics on a sum of router hop counts between a first alternative switching device and the computing nodes, the controller may mark a path that is in a topology structure between the first alternative switching device and the computing nodes and that is between every two adjacent devices as one hop.

For example, for the topology structure shown in FIG. 4, in the topology structure between the alternative switching device SW1 and the three computing nodes, a path between the computing node V1 and the alternative switching device SW2 may be marked as one hop, a path between the computing node V2 and the alternative switching device SW2 may be marked as one hop, a path between the alternative switching device SW2 and the alternative switching device SW1 may be marked as one hop, a path between the computing node V7 and the switching device SW5 may be marked as one hop, and a path between the switching device SW5 and the alternative switching device SW1 may be marked as one hop. Therefore, the controller 01 may determine that a sum of router hop counts between the alternative switching device SW1 and the three computing nodes is 5. Similarly, the controller 01 may determine that a sum of router hop counts between the alternative switching device SW6 and the three computing nodes is also 5, and a sum of router hop counts between the alternative switching device SW2 and the three computing nodes is also 5.

Step 1054: When there is one alternative switching device corresponding to a minimum sum of router hop counts, determine the alternative switching device corresponding to the minimum sum of the router hop counts as the target switching device.

If the controller can determine one alternative switching device corresponding to a minimum sum of router hop counts, the controller may directly determine the alternative switching device corresponding to the minimum sum of the router hop counts as the target switching device. In the method provided in this embodiment of the present disclosure, each switching device has a capability of combining data. After receiving data reported by a plurality of other devices (for example, computing nodes or switching devices), a switching device may combine received data and then send combined data to a switching device in a next hop. Therefore, in a process in which the computing nodes report the data each time, a path marked as one hop between every two adjacent devices may be used to transmit only one piece of data.

It can be learned from the foregoing analysis that a sum of router hop counts can intuitively reflect volumes of data transmitted between each alternative switching device and the computing nodes in a data transmission process, and an alternative switching device corresponding to a minimum sum of router hop counts is selected as the target switching device such that volumes of data transmitted between the target switching device and the computing nodes are all relatively small, and the data transmission delay and the probability of the network congestion are effectively reduced, thereby effectively improving the efficiency of executing the calculation task.

Step 1055: When there are a plurality of alternative switching devices corresponding to minimum sums of router hop counts, separately determine a performance parameter of each alternative switching device corresponding to a minimum sum of router hop counts.

If there are a plurality of alternative switching devices corresponding to minimum sums of router hop counts, the controller may determine the target switching device based on performance parameters of the alternative switching devices corresponding to the minimum sums of router hop counts. A performance parameter of each alternative switching device corresponding to a minimum sum of router hop counts may include at least one of available bandwidth, computing load, a throughput, and a quantity of times for which the alternative switching device is selected as the target switching device. The computing load may be load when the switching device combines data. In this embodiment of the present disclosure, the controller may obtain a performance parameter of each switching device in the data center network in real time or periodically. For example, the controller 01 may periodically obtain a performance parameter of each switching device using an acceleration controller 012 of the controller 01.

Step 1056: Determine, from the plurality of alternative switching devices corresponding to the minimum sums of the router hop counts, an alternative switching device having a performance parameter that meets a preset condition as the target switching device.

In a specific embodiment, based on different parameter types of a performance parameter obtained by the controller, the preset condition may be different. For example, when the performance parameter includes available bandwidth, the preset condition may be that available bandwidth of a switching device is the highest. When the performance parameter includes a throughput, the preset condition may be that a throughput of the switching device is the lowest. When the performance parameter includes computing load, the preset condition may be that computing load of the switching device is the lowest. When the performance parameter includes a quantity of times for which the switching device is selected as the target switching device, the preset condition may be that a quantity of times for which the switching device is selected as the target switching device is the smallest. In addition, if there are a plurality of types of performance parameters, the controller may sequentially determine the target switching device using a parameter having a higher priority as a standard based on a preset parameter priority.

For example, assuming that the preset parameter priority is available bandwidth, computing load, a throughput, and a quantity of times for which a switching device is selected as the target switching device, when determining the target switching device, the controller may first compare available bandwidth of the alternative switching devices, and selects an alternative switching device having highest available bandwidth as the target switching device. If there are a plurality of alternative switching devices having the highest available bandwidth, the controller may continue to compare computing load of the plurality of alternative switching devices having the highest available bandwidth. If there are a plurality of alternative switching devices having lowest computing load among the plurality of alternative switching devices having the highest available bandwidth, the controller may continue to compare throughputs of the alternative switching devices. Such a process continues until the target switching device that meets the preset condition is determined. In addition, if there are a plurality of alternative switching devices that are determined by the controller using the foregoing determining process and that have performance parameters that meet the preset condition, the controller may randomly determine, from the plurality of alternative switching devices having performance parameters that meet the preset condition, one alternative switching device as the target switching device.

For example, in the topology structure shown in FIG. 4, when a sum of router hop counts corresponding to each of the alternative switching device SW1, the alternative switching device SW2, and the alternative switching device SW6 is 5, the controller may compare performance parameters of the three alternative switching devices. Assuming that the performance parameters obtained by the controller are computing load, and computing load of the alternative switching device SW1 is the lowest, the controller may determine the alternative switching device SW1 as the target switching device.

In this embodiment of the present disclosure, the target switching device is selected using sums of router hop counts corresponding to the switching devices and performance parameters of the switching devices such that it can be ensured that a volume of data transmitted between the selected target switching device and the computing nodes is relatively small, and the target switching device has relatively good performance, thereby ensuring relatively high computing efficiency.

In this embodiment of the present disclosure, in addition to determining the target switching device based on the performance parameters, the controller may further separately determine a balance degree of router hop counts between each alternative switching device corresponding to a minimum sum of router hop counts and the computing nodes, and determine an alternative switching device having a highest balance degree of router hop counts as the target switching device. Certainly, in step 1056, the controller may alternatively determine a plurality of alternative switching devices having performance parameters that meet the preset condition, and then determine the target switching device based on balance degrees of router hop counts. The target switching device needs to first obtain the data reported by all computing nodes configured to execute the specified calculation task, and then can combine the data. Therefore, the switching device having the highest balance degree of router hop counts is selected as the target switching device such that it can be ensured that required duration in which the computing nodes report the data is relatively close. In this way, the target switching device may receive, in a relatively short time, the data reported by all computing nodes, and combines the data, thereby reducing waiting duration of the target switching device, and further improving the efficiency of executing the calculation task.

A balance degree of router hop counts may be determined using a parameter such as a variance, a mean square error, or a mean deviation of the router hop counts. In addition, the balance degree is negatively correlated with a parameter value of any one of the parameters. To be specific, when a parameter value is smaller, it indicates that a balance degree is higher. For example, for each alternative switching device among the plurality of alternative switching devices corresponding to the minimum sums of the router hop counts, the controller may separately collect statistics on router hop counts between the alternative switching device and each computing node, calculate a variance of router hop counts between the alternative switching device and the computing nodes, and then may determine an alternative switching device corresponding to a minimum variance as the target switching device.

It should be noted that, in this embodiment of the present disclosure, when determining the plurality of alternative switching devices in step 104, the controller may further determine any one of the plurality of alternative switching devices as the target switching device. Alternatively, the controller may further determine, from the plurality of alternative switching devices, candidate switching devices that can be connected to each of the plurality of computing nodes using downlink paths, and then determine the target switching device from the candidate switching devices. For example, for the topology structure shown in FIG. 4, the alternative switching devices are SW1, SW2, and SW6. Because connections between the three computing nodes and the alternative switching devices SW1 and SW6 can be established using downlink paths, the controller may use the alternative switching devices SW1 and SW6 as candidate switching devices, and determine the target switching device from the two candidate switching devices.

Step 106: The controller determines, from alternative switching devices other than the target switching device, an alternative switching device configured to connect to the target switching device and at least two computing nodes as the intermediate switching device.

In this embodiment of the present disclosure, if the controller determines the plurality of alternative switching devices in step 104, after determining the target switching device, the controller may further determine, from the remaining alternative switching devices, the alternative switching device configured to connect to the target switching device and the at least two computing nodes among the plurality of computing nodes as the intermediate switching device. In a process of executing the specified calculation task, the intermediate switching device may combine data reported by the at least two computing nodes connected to the intermediate switching device, and then send combined data to the target switching device. Therefore, the volume of the data transmitted in the network may further be reduced.

For example, referring to FIG. 4, assuming that the alternative switching devices are SW1, SW2, and SW6, after the controller 01 determines that the target switching device is SW1, among remaining two alternative switching devices, the alternative switching device SW2 can connect to the target switching device SW1 and the two computing nodes (V1 and V2). Therefore, the alternative switching device SW2 may be determined as the intermediate switching device.

Figure 6:
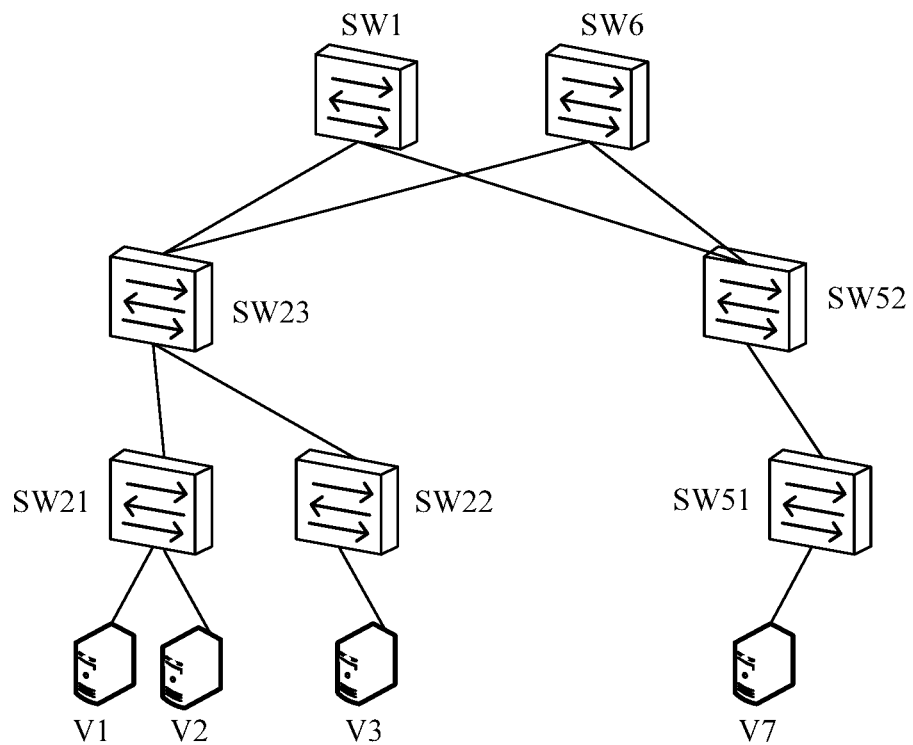
FIG. 6 is a schematic diagram of another topology structure between a plurality of computing nodes according to an embodiment of the present disclosure.

Alternatively, referring to FIG. 6, assuming that computing nodes configured to execute the specified calculation task include computing nodes V1, V2, V3, and V7, it can be learned from a topology structure shown in FIG. 6 that the alternative switching devices that can be connected to the at least two computing nodes using the downlink paths include SW21, SW23, SW1, and SW6. If SW1 is finally determined as the target switching device, among remaining three alternative switching devices, alternative switching devices SW21 and SW23 can connect to the target switching device SW1 and the two computing nodes (V1 and V2). Therefore, the controller 01 may determine both the alternative switching devices SW21 and SW23 as intermediate switching devices.

Step 107: The controller separately sends routing information to the target switching device, the intermediate switching device, and the specified node.

The routing information may be used to indicate data forwarding paths between the plurality of computing nodes and the target switching device. For example, the routing information may include identifiers of the plurality of computing nodes and an identifier of the target switching device. If the data forwarding paths between the plurality of computing nodes and the target switching device further include the intermediate switching device, the routing information may further include an identifier of the intermediate switching device.

In this embodiment of the present disclosure, to reduce a data volume of the routing information and improve efficiency of sending the routing information, routing information that is corresponding to the specified calculation task and that is sent by the controller to each device may include only identifiers of directly connected devices that are of the device and that are in the data forwarding paths. The directly connected devices may include the plurality of computing nodes, the intermediate switching device, and the target switching device. However, other switching devices that are not selected as intermediate switching devices and that are in the data forwarding paths are not counted in the routing information.

For example, routing information sent by the controller to the target switching device may include only an identifier of a directly connected device of the target switching device, and the directly connected device of the target switching device may be a computing node or an intermediate switching device. Routing information sent by the controller to the specified node may include only an identifier of a switching device directly connected to each computing node. That is, the routing information sent by the controller to the specified node may include a parameter server list. An identifier of a switching device configured to implement a function of the parameter server is recorded in the parameter server list. The specified node is configured to send, to a corresponding computing node, an identifier of an intermediate switching device or the target switching device directly connected to each computing node. Routing information sent by the controller to each intermediate switching device may include an identifier of a directly connected device of the intermediate switching device, and the directly connected device of each intermediate switching device is a computing node, the target switching device, or another intermediate switching device.

For example, with reference to FIG. 4, it is assumed that the computing nodes configured to execute the distributed AI training task are the computing nodes V1, V2, and V7, the target switching device is SW1, and the intermediate switching device is SW2. Directly connected devices of the target switching device SW1 are the intermediate switching device SW2 and the computing node V7. Directly connected devices of the intermediate switching device SW2 are the target switching device SW1, and the computing nodes V1 and V2. Directly connected devices of both the computing nodes V1 and V2 are the intermediate switching devices SW2. A directly connected device of the computing node V7 is the target switching device SW1. Routing information sent by the controller 01 to the target switching device SW1 may include only the IP address of the intermediate switching device SW2 and the IP address of the computing node V7. Routing information sent by the controller 01 to the intermediate switching device SW2 may include the IP address of the target switching device SW1, the IP address of the computing node V1, and the IP address of the computing node V2. Routing information sent by the controller 01 to the specified node V1 may include the IP address of the intermediate switching device SW2 and the IP address of the target switching device SW1. A process in which the controller 01 sends routing information to the devices may be shown by dashed lines numbered 2 in FIG. 3.

It should be noted that in step 102, after receiving the processing request that is sent by the specified node and that is for the specified calculation task, the controller may further generate a task identifier (taskID) for the specified calculation task. For example, taskID generated by the controller for the distributed AI training task may be 1. Alternatively, the controller may directly determine the identifier that is of the specified calculation task and that is carried in the processing request as the task identifier.

Correspondingly, when sending the routing information corresponding to the specified calculation task to the devices, the controller may further add the task identifier to the routing information such that the devices may store, based on the task identifier, routing information corresponding to different calculation tasks.

For example, routing information stored in the target switching device SW1 may be shown in Table 1. It can be learned from Table 1 that routing information corresponding to the calculation task having taskID 1 includes two IP addresses, that is, IP1 and IP2. IP1 may be the IP address of the intermediate switching device SW2, and IP2 is the IP address of the computing node V7. Routing information corresponding to a calculation task having taskID 2 may include three IP addresses, that is, IP3 to IP5.

TABLE 1

| taskID | Routing information | Combining type |
|--------|---------------------|----------------|
| 1      | IP1 and IP2         | Calculation of a weighted average value |
| 2      | IP3, IP4, and IP5   | Summation      |

It should further be noted that in step 102, the processing request sent by the specified node to the controller may further include a combining type corresponding to the specified calculation task. Therefore, the controller may further send the combining type corresponding to the specified calculation task to the target switching device and each intermediate switching device such that the target switching device and each intermediate switching device may combine, based on the combining type, the data reported by the plurality of computing nodes. Because different calculation tasks may be corresponding to different combining types, received data is combined based on the combining type corresponding to the specified calculation task such that data processing precision can be ensured.

For example, the combining type may include any one of calculation of an average value, calculation of a weighted average value, summation, calculation of a maximum value, and calculation of a minimum value.

In addition, when sending the routing information corresponding to the specified calculation task to the target switching device and each intermediate switching device, the controller may send the combining type corresponding to the specified calculation task. Alternatively, the controller may send the combining type corresponding to the specified calculation task alone. This is not limited in this embodiment of the present disclosure.

For example, assuming that a combining type corresponding to the distributed AI training task having taskID 1 is calculation of a weighted average value, when the controller sends routing information corresponding to the distributed AI training task to the target switching device SW1 and the intermediate switching device SW2, it may be declared in the routing information that the combining type corresponding to the distributed AI training task is the calculation of a weighted average value such that the switching devices may store the combining type corresponding to the distributed AI training task. For example, referring to Table 1, the target switching device SW1 may store the combining type corresponding to the calculation task having taskID 1, where the combining type is the calculation of a weighted average value. The combining type corresponding to the calculation task having taskID 2 is summation.

Step 108: The specified node sends routing information to each computing node.

After receiving the routing information that is corresponding to the specified calculation task and that is sent by the controller, the specified node may forward the routing information to the computing nodes such that the computing nodes may report the data based on received routing information after finishing data calculation.

Further, the routing information sent by the controller to the specified node may include only an identifier of a directly connected device of each computing node, and the directly connected device of the computing node is an intermediate switching device or the target switching device configured to implement a function of the parameter server. Therefore, the routing information sent by the specified node to each computing node may alternatively include only an identifier of a switching device that is directly connected to the computing node and that is configured to implement the function of the parameter server.

For example, routing information sent by the specified node V1 to the computing node V2 may include only the IP address of the intermediate switching device SW2 directly connected to the computing node V2, and the routing information sent by the specified node V1 to the computing node V7 may include only the IP address of the target switching device SW1 directly connected to the computing node V7. A process in which the specified node V1 sends routing information to the computing nodes may be shown by dashed lines numbered 3 in FIG. 4.

Step 109: Each computing node performs data calculation based on an algorithm model corresponding to the specified calculation task.

In this embodiment of the present disclosure, each computing node configured to execute the specified calculation task pre-stores the algorithm model corresponding to the specified calculation task. After receiving a drive instruction delivered by the specified node, each computing node may perform data calculation on obtained input data based on the algorithm model.

For example, it is assumed that the distributed AI training task is a training task of a DNN-based image recognition application. The training task may include iterations of a plurality of same computing sets. In each iteration process, a plurality of sample pictures may be separately input to each computing node, and each computing node may perform data calculation on the plurality of input sample pictures based on a pre-stored neural network model, to obtain a gradient (that is, error correction data) of the neural network model used by the image recognition application.

Step 110: Each computing node reports data to a corresponding switching device.

Further, after finishing data calculation, each computing node may report, based on received routing information, data obtained through calculation to a corresponding switching device.

For example, referring to a dashed line numbered 4 in FIG. 4, the computing node V1 and the computing node V2 may send, based on received routing information, gradients obtained through calculation to the intermediate switching device SW2. Referring to a dashed line numbered 5 in FIG. 4, the computing node V7 may directly send, based on received routing information, a gradient obtained through calculation to the target switching device SW1. Referring to FIG. 4, it can further be learned that when reporting the gradient to the target switching device SW1, the computing node V7 needs to transparently transmit data using the switching device SW5. To be specific, the switching device SW5 only forwards data, but does not process the data.

Step 111: The intermediate switching device combines the data reported by the at least two computing nodes connected to the intermediate switching device.

In this embodiment of the present disclosure, referring to FIG. 1C, a parameter server configured to combine the data may be configured in each switching device. After receiving routing information sent by the controller, each intermediate switching device may configure and start a local parameter server instance, and may combine received data based on the parameter server instance after receiving data reported by at least two computing nodes connected to the intermediate switching device.

For example, after receiving gradients reported by the computing node V1 and the computing node V2, the intermediate switching device SW2 may combine the gradients reported by the two computing nodes.

Further, the controller may further send the combining type corresponding to the specified calculation task to each intermediate switching device. Therefore, correspondingly, after receiving the data reported by the at least two computing nodes configured to execute the specified calculation task, each intermediate switching device may further combine, based on the combining type corresponding to the specified calculation task, the data reported by the at least two computing nodes.

For example, it is assumed that when the controller 01 sends the routing information to the intermediate switching device SW2, it is further declared that the combining type corresponding to the distributed AI training task is the calculation of a weighted average value. After receiving the gradients reported by the computing node V1 and the computing node V2, the intermediate switching device SW2 may calculate a weighted average value of the gradients reported by the two computing nodes. When reporting a gradient, each computing node may further report a weight corresponding to the gradient. Therefore, the intermediate switching device SW2 may calculate a weighted average value of gradients based on weights reported by the computing nodes.

Step 112: The intermediate switching device sends combined data to the target switching device.

After combining the data reported by at least two computing nodes connected to each intermediate switching device, the intermediate switching device may send combined data to the target switching device based on received routing information. Because the intermediate switching device can combine the data reported by the at least two computing nodes and then send the data, as compared with separately forwarding the data reported by the two computing nodes by a switching device, in the method provided in this embodiment of the present disclosure, the intermediate switching device needs to report data in only one path to the target switching device. Therefore, the volume of the data transmitted in the data center network can be effectively reduced, and the probability of the network congestion can be reduced.

For example, referring to a dashed line numbered 6 in FIG. 4, the intermediate switching device SW2 may send, based on the IP address of the target switching device SW1 in the received routing information, the weighted average value obtained through calculation to the target switching device SW1.

Step 113: The target switching device combines the received data.

In this embodiment of the present disclosure, referring to FIG. 1C, the parameter server configured to combine the data may be configured in the target switching device. After receiving the routing information sent by the controller, the target switching device may configure and start a local parameter server instance, and may combine the received data based on the parameter server instance after receiving the data reported by the computing nodes and/or the intermediate switching device.

For example, after receiving a gradient reported by the computing node V7 and a weighted average value reported by the intermediate switching device SW2, the target switching device SW2 may combine the gradient and the weighted average value.

Further, the controller may further send the combining type corresponding to the specified calculation task to the target switching device. Therefore, correspondingly, after receiving the data reported by the computing nodes and/or the intermediate switching device corresponding to the specified calculation task, the target switching device may further combine the received data based on the combining type corresponding to the specified calculation task.

For example, assuming that the target switching device stores a correspondence shown in Table 1, after receiving the gradient reported by the computing node V7 having the IP address IP2 and the weighted average value reported by the intermediate switching device SW2 having the IP address IP1, the target switching device SW1 may calculate a weighted average value of the gradient and the weighted average value. When reporting the gradient, the computing node V7 may further report a weight corresponding to the gradient. Therefore, the target switching device SW1 may calculate, based on the weight reported by the computing node V7, a weighted average value of the gradient reported by the computing node V7 and the weighted average value reported by the intermediate switching device SW2.

Step 114: The target switching device sends the combined data to each computing node.

Finally, the target switching device may separately send the combined data to each computing node based on the routing information such that the computing nodes continue to execute the specified calculation task based on the combined data. In addition, a data forwarding path used for the target switching device to send the combined data to a first computing node may be the same as or different from a data forwarding path used for the first computing node to report the data. This is not limited in this embodiment of the present disclosure. The first computing node may be any node among the plurality of computing nodes.

Optionally, in this embodiment of the present disclosure, because the distributed calculation task usually includes a process of computing a plurality of iterations, each computing node may send an obtaining request to the target switching device before a next iteration starts, and after receiving the obtaining request, the target switching device may send the combined data to the computing nodes.

For example, referring to dashed lines numbered 7 in FIG. 4, the target switching device SW1 may separately send the weighted average value obtained through calculation to the computing node V1, the computing node V2, and the computing node V7. For example, the target switching device SW1 may separately forward the weighted average value to the computing node V1 and the computing node V2 using the intermediate switching device SW2, and may forward the weighted average value to the computing node V7 using the switching device SW5. The computing node V1, the computing node V2, and the computing node V7 are configured to continue to perform model training of the image recognition application based on the weighted average value.

It should be noted that a sequential order of steps of the data processing method provided in this embodiment of the present disclosure may be adjusted to some extent, or a step may be correspondingly added or omitted based on a situation. For example, step 104 may be deleted based on a situation. In step 105, the controller may directly determine the target switching device from the switching devices configured to connect to the plurality of computing nodes. Correspondingly, in step 106, the controller may determine, as the target switching device, a switching device that is in the data forwarding paths between the target switching device and the computing nodes and that is configured to connect to the target switching device and at least two computing nodes. Alternatively, step 106 and step 111 may be deleted based on a situation. To be specific, the controller may determine only one target switching device, and the target switching device combines the data reported by the computing nodes. Alternatively, step 1051 and step 1052 may be deleted based on a situation. To be specific, after determining the topology structure between the computing nodes, the controller may directly determine the target switching device based on a sum of router hop counts. Alternatively, step 1053 and step 1054 may be deleted based on a situation. To be specific, the controller may directly determine the target switching device based on performance parameters (or balance degrees of router hop counts) of the switching devices. A changed method that is easily conceived of by any person skilled in the art within the technical scope disclosed in the present disclosure shall fall within the protection scope of the present disclosure, and is therefore no longer described in detail.

In conclusion, this embodiment of the present disclosure provides a data processing method. The processing request that is for the specified calculation task and that is sent by the specified node to the controller includes the identifiers of the plurality of computing nodes configured to execute the specified calculation task. After receiving the processing request, the controller may determine the target switching device from the switching devices configured to connect to the plurality of computing nodes, and separately send, to the target switching device and the specified node, the routing information used to indicate the data forwarding paths between the plurality of computing nodes and the target switching device such that each computing node may report data to the target switching device based on the routing information, and the target switching device may combine, based on the routing information, the data reported by the plurality of computing nodes, and then send the combined data to each computing node. Because the target switching device may combine the data reported by the plurality of computing nodes, the computing nodes do not need to send the data to the parameter server using switching devices, and the parameter server does not need to feed a combining result back to the computing nodes using the switching devices such that the volume of the data transmitted in the data center network is effectively reduced, and the probability of network congestion and the data transmission delay are reduced, thereby improving efficiency of executing the calculation task.

Optionally, the method provided in this embodiment of the present disclosure may further be applied to an HPC data center network, and in the HPC data center network, a Message Passing Interface (MPI) may be used as a programming interface for distributed information exchange. In addition, some operations (for example, a reduction operation and an aggregation operation) among set operations performed by the MPI may be offloaded to a switching device using a Scalable Hierarchical Aggregation and Reduction Protocol (SHARP) technology, that is, the switching device performs the some operations. That is, in the data center network, the SHARP technology may be supported, or the data processing method provided in this application may be supported. Further, the switching devices in the data center network may implement the SHARP technology under control of a management server, and may implement the data processing method provided in this embodiment of the present disclosure under control of the controller. Because the SHARP technology is limited by the set operations performed by the MPI, the computing nodes need to use a specific MPI function library, and application flexibility of the SHARP technology is relatively low. In addition, no root aggregation node is disposed during the set operations performed by the MPI, and consequently calculation complexity is relatively high when the management server selects the switching device configured to perform the some operations. Therefore, it is difficult to support a relatively large-scale data center network using only the SHARP technology. Comparatively, after the data processing method provided in this embodiment of the present disclosure is used in the HPC data center network, because a switching device can implement the function of the parameter server, the switching devices are no longer limited to the set operations performed by the MPI, thereby effectively improving flexibility of data processing. In addition, because the controller needs to select only the target switching device and the intermediate switching device that are configured to implement the function of the parameter server function, calculation complexity of such selecting process is relatively low, and a relatively large-scale data center network can be supported.

Figure 7:
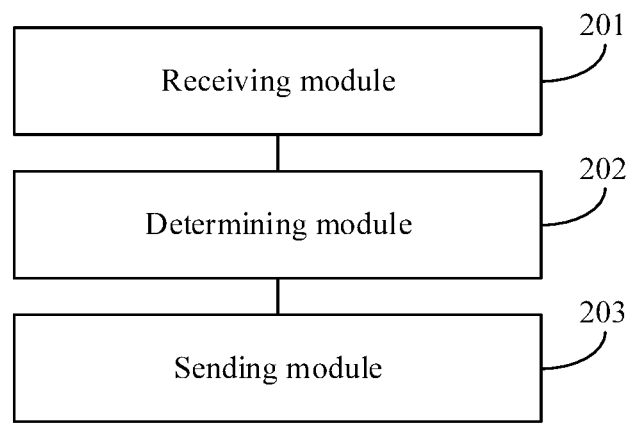
FIG. 7 is a schematic structural diagram of a data processing apparatus according to an embodiment of the present disclosure.

FIG. 7 is a schematic structural diagram of a data processing apparatus according to an embodiment of the present disclosure. The apparatus may be applied to the controller 01 in the data center network shown in FIG. 1A. Referring to FIG. 7, the apparatus may include the following modules.

A receiving module 201 is configured to receive a processing request that is for a specified calculation task and that is sent by a specified node. The processing request includes identifiers of a plurality of computing nodes configured to execute the specified calculation task. For specific implementation of the receiving module 201, refer to detailed description in step 102 in the embodiment shown in FIG. 2A and FIG. 2B. Details are not described herein again.

A determining module 202 is configured to determine a target switching device from switching devices configured to connect to the plurality of computing nodes. For specific implementation of the determining module 202, refer to detailed description in step 104 and step 105 in the embodiment shown in FIG. 2A and FIG. 2B. Details are not described herein again.

A sending module 203 is configured to separately send routing information corresponding to the specified calculation task to the target switching device and the specified node. The routing information is used to indicate data forwarding paths between the plurality of computing nodes and the target switching device. For specific implementation of the sending module 203, refer to detailed description in step 107 in the embodiment shown in FIG. 2A and FIG. 2B. Details are not described herein again.

The routing information is used for the target switching device to send, after the target switching device combines data reported by the plurality of computing nodes, combined data to each computing node based on the routing information. That is, based on the routing information, the target switching device may combine data reported by the plurality of computing nodes, and then send combined data to each computing node. In addition, after receiving the routing information, the specified node may send the routing information to each computing node, and each computing node is configured to report data to the target switching device based on the routing information.

In addition, functions of the receiving module 201 and the sending module 203 may be similar to functions of the acceleration application 011 and the data channel 013 in the architecture shown in FIG. 1D. A function of the determining module 202 may be similar to a function of the acceleration controller 012 in the architecture shown in FIG. 1D.

Optionally, the data forwarding paths between the plurality of computing nodes and the target switching device may include at least one switching device.

Correspondingly, the determining module 202 may further be configured to determine at least one intermediate switching device from the at least one switching device. Each intermediate switching device is connected to at least two computing nodes. For specific implementation, refer to detailed description in step 106 in the embodiment shown in FIG. 2A and FIG. 2B. Details are not described herein again.

The sending module 203 may further be configured to send the routing information to each intermediate switching device. Each intermediate switching device is configured to combine, based on the routing information, data reported by at least two computing nodes connected to the intermediate switching device, and send combined data to the target switching device. For specific implementation, refer to detailed description in step 107 in the embodiment shown in FIG. 2A and FIG. 2B. Details are not described herein again.

Figure 8:
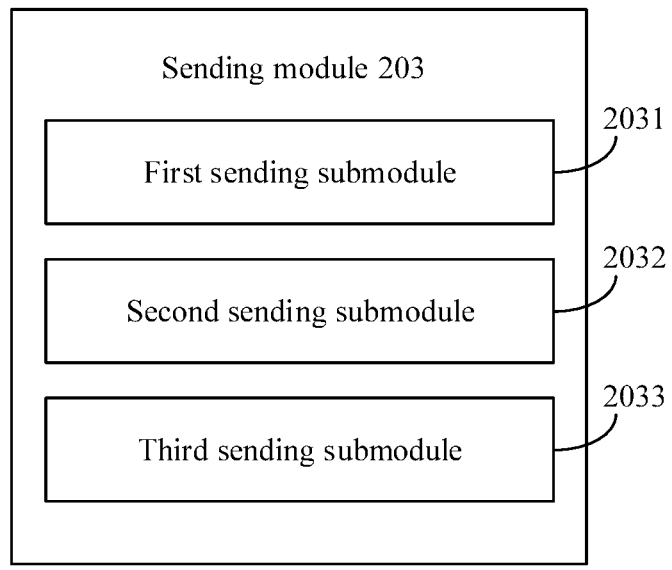
FIG. 8 is a schematic structural diagram of a sending module according to an embodiment of the present disclosure.

Optionally, the routing information may include an identifier of each computing node, an identifier of the target switching device, and an identifier of the intermediate device. FIG. 8 is a schematic structural diagram of a sending module according to an embodiment of the present disclosure. Referring to FIG. 8, the sending module 203 may include a first sending submodule 2031 configured to send an identifier of a directly connected device of the target switching device to the target switching device, where the directly connected device of the target switching device is a computing node or an intermediate switching device, a second sending submodule 2032 configured to send an identifier of a directly connected device of each computing node to the specified node, where the directly connected device of the computing node is the target switching device or an intermediate switching device, and the specified node is configured to send the identifier of the directly connected device of the computing node to the corresponding computing node, and a third sending submodule 2033 configured to send an identifier of a directly connected device of the intermediate switching device to the intermediate switching device, where the directly connected device of the intermediate switching device is a computing node, the target switching device, or another intermediate switching device.

For specific implementation of the foregoing sending submodules, refer to detailed description in step 107 in the embodiment shown in FIG. 2A and FIG. 2B. Details are not described herein again.

Figure 9:
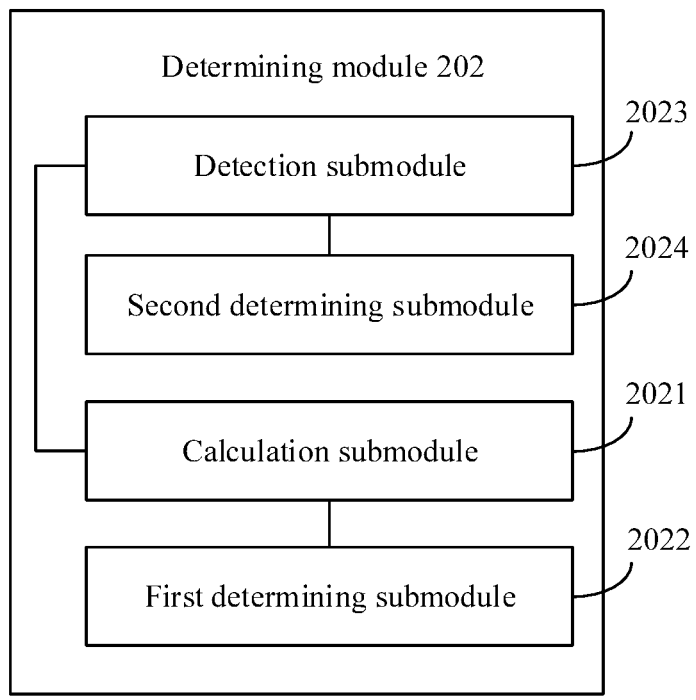
FIG. 9 is a schematic structural diagram of a determining module according to an embodiment of the present disclosure.

FIG. 9 is a schematic structural diagram of a determining module according to an embodiment of the present disclosure. Referring to FIG. 9, the determining module 202 may include the following submodules.

A calculation submodule 2021 is configured to calculate a sum of router hop counts between computing nodes and each switching device among switching devices configured to connect to the plurality of computing nodes. For specific implementation of the calculation submodule 2021, refer to detailed description in step 1053 in the embodiment shown in FIG. 5. Details are not described herein again.

A first determining submodule 2022 is configured to determine a switching device corresponding to a minimum sum of router hop counts as the target switching device.

For specific implementation of the first determining submodule 2022, refer to detailed description in step 1054 to step 1056 in the embodiment shown in FIG. 5. Details are not described herein again.

Optionally, as shown in FIG. 9, the determining module 202 may further include a detection submodule 2023 configured to implement the method shown in step 1051 in the embodiment shown in FIG. 5, and a second determining submodule 2024 configured to implement the method shown in step 1052 in the embodiment shown in FIG. 5.

Correspondingly, the calculation submodule 2021 may be configured to implement the method shown in step 1053 in the embodiment shown in FIG. 5.

Optionally, the determining module 202 may further be configured to implement the method shown in step 103 to step 105 in the embodiment shown in FIG. 2A and FIG. 2B.

Optionally, the processing request may further include a combining type corresponding to the specified calculation task.

Correspondingly, the sending module 203 may further be configured to send the combining type corresponding to the specified calculation task to the target switching device. The target switching device is configured to combine, based on the combining type, the data reported by the plurality of computing nodes. For specific implementation, refer to detailed description in step 107 in the embodiment shown in FIG. 2A and FIG. 2B. Details are not described herein again.

In conclusion, this embodiment of the present disclosure provides a data processing apparatus. The processing request that is for the specified calculation task and that is received by the apparatus includes the identifiers of the plurality of computing nodes configured to execute the specified calculation task. The apparatus may determine the target switching device from the switching devices configured to connect to the plurality of computing nodes, and separately send, to the target switching device and the specified node, the routing information used to indicate the data forwarding paths between the plurality of computing nodes and the target switching device such that each computing node may report data to the target switching device based on the routing information, and the target switching device may combine, based on the routing information, the data reported by the plurality of computing nodes, and then send the combined data to each computing node. Because the target switching device may combine the data reported by the plurality of computing nodes, the computing nodes do not need to send the data to a parameter server using switching devices, and the parameter server does not need to feed a combining result back to the computing nodes using the switching devices such that a volume of data transmitted in the data center network is effectively reduced, and a probability of network congestion and a data transmission delay are reduced, thereby improving efficiency of executing the calculation task.

Figure 10:
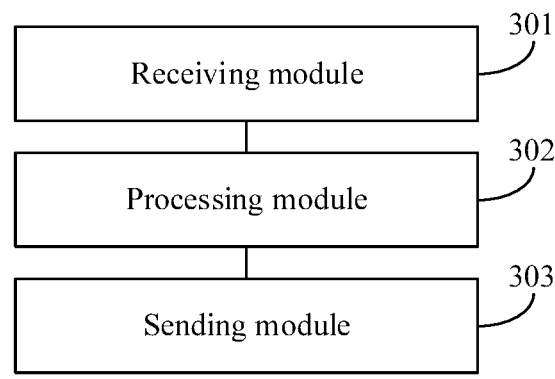
FIG. 10 is a schematic structural diagram of another data processing apparatus according to an embodiment of the present disclosure.

FIG. 10 is a schematic structural diagram of another data processing apparatus according to an embodiment of the present disclosure. The apparatus may be applied to the switching device 03 in the data center network shown in FIG. 1A. Referring to FIG. 10, the apparatus may include the following modules.

A receiving module 301 is configured to receive routing information that is corresponding to a specified calculation task and that is sent by a controller. The routing information is used to indicate data forwarding paths between a plurality of computing nodes and a target switching device, and the plurality of computing nodes are configured to execute the specified calculation task. For specific implementation of the receiving module 301, refer to detailed description in step 107 in the embodiment shown in FIG. 2A and FIG. 2B. Details are not described herein again.

A processing module 302 is configured to combine data reported by the plurality of computing nodes. For specific implementation of the processing module 302, refer to detailed description in step 111 or step 113 in the embodiment shown in FIG. 2A and FIG. 2B. Details are not described herein again.

A sending module 303 is configured to send combined data based on the routing information. For specific implementation of the sending module 303, refer to detailed description in step 112 or step 114 in the embodiment shown in FIG. 2A and FIG. 2B. Details are not described herein again.

The routing information is sent by the controller after the controller receives a processing request that is for the specified calculation task and that is sent by a specified node, and determines the target switching device from switching devices configured to connect to the plurality of computing nodes.

In addition, functions of the receiving module 301 and the sending module 303 may be similar to a function of the switching functional component 021 in the architecture shown in FIG. 1B. A function of the processing module 302 may be similar to a function of the network computing component 022 in the architecture shown in FIG. 1B.

Optionally, the receiving module 301 is further configured to, before combining the data reported by the plurality of computing nodes, receive a combining type that is corresponding to the specified calculation task and that is sent by the controller. For specific implementation, refer to detailed description in step 107 in the embodiment shown in FIG. 2A and FIG. 2B. Details are not described herein again.

Correspondingly, the processing module 302 may be configured to combine, based on the combining type, the data reported by the plurality of computing nodes. For specific implementation, refer to detailed description in step 111 or step 113 in the embodiment shown in FIG. 2A and FIG. 2B. Details are not described herein again.

Optionally, when a switching device may be the target switching device, the sending module 303 may be configured to implement the method described in step 114 in the embodiment shown in FIG. 2A and FIG. 2B.

Optionally, when the switching device is an intermediate switching device configured to connect to the target switching device and at least two computing nodes, the processing module 302 may be configured to implement the method described in step 111 in the embodiment shown in FIG. 2A and FIG. 2B.

The sending module 303 may be configured to implement the method described in step 112 in the embodiment shown in FIG. 2A and FIG. 2B.

In addition, in this embodiment of the present disclosure, the data processing apparatus may further include a topology aware module. The topology aware module is configured to after a topology of the data center network is stable, obtain an identifier of another device connected to the switching device, and report the identifier to the controller. A function of the topology aware module may be similar to a function of the network management component 023 in the architecture shown in FIG. 1B.

In conclusion, this embodiment of the present disclosure provides a data processing apparatus. The apparatus may combine, based on the routing information that is corresponding to the specified calculation task and that is sent by the controller, the data reported by the plurality of computing nodes configured to execute the specified calculation task, and then send the combined data to each computing node. Therefore, the computing nodes do not need to send data to a parameter server using switching devices, and the parameter server does not need to feed a combining result back to the computing nodes using the switching devices such that a volume of data transmitted in the data center network is effectively reduced, and a probability of network congestion and a data transmission delay are reduced, thereby improving efficiency of executing the calculation task.

For the apparatus in the foregoing embodiment, an implementation in which the modules perform operations has been described in detail in the embodiments related to the method, and details are not described herein again.

Figure 11:
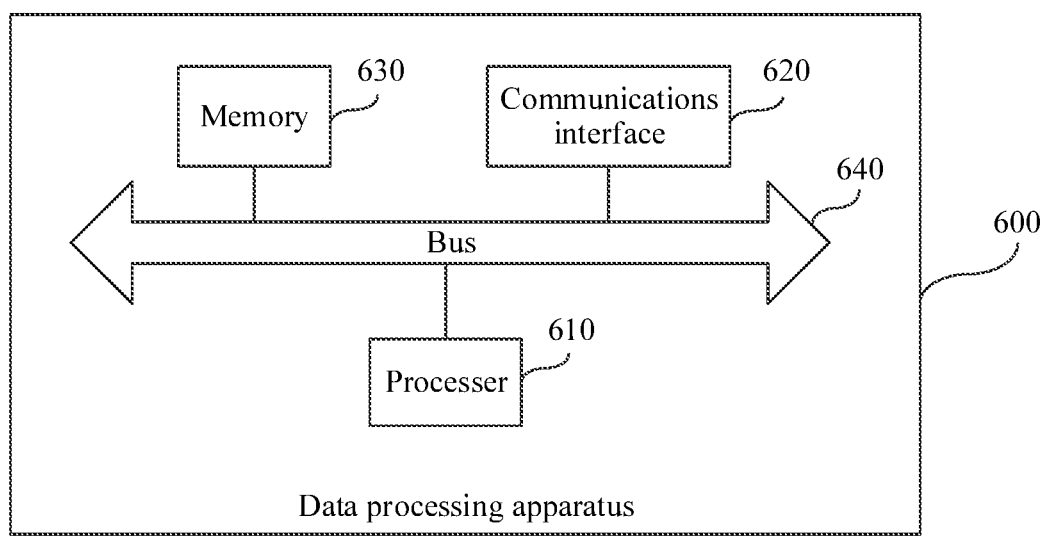
FIG. 11 is a schematic structural diagram of still another data processing apparatus according to an embodiment of the present disclosure.

FIG. 11 is a schematic structural diagram of a data processing apparatus 600 according to an embodiment of this application. The data processing apparatus may be configured in the controller 01 shown in FIG. 1A. Referring to FIG. 11, the data processing apparatus 600 may include a processor 610, a communications interface 620, and a memory 630, and the communications interface 620 and the memory 630 are separately connected to the processor 610. For example, as shown in FIG. 11, the communications interface 620 and the memory 630 are connected to the processor 610 using a bus 640.

The processor 610 may be a CPU, and the processor 610 includes one or more processing cores. The processor 610 runs a computer program to execute various functional applications and perform data processing. For specific implementation of the processor 610, refer to detailed description in step 103 to step 106 in the embodiment shown in FIG. 2A and FIG. 2B and detailed description in the embodiment shown in FIG. 5. Details are not described herein again.

There may be a plurality of communications interfaces 620. The communications interface 620 is used for the data processing apparatus 600 to communicate with an external device such as a display or a third-party device (for example, a storage device, a mobile terminal, or a switching device). For specific implementation of the communications interface 620, refer to detailed description in step 101, step 102, and step 107 in the embodiment shown in FIG. 2A and FIG. 2B. Details are not described herein again.

The memory 630 may include but is not limited to a random-access memory (RAM), a read-only memory (ROM), an erasable programmable ROM (EPROM), a flash memory, or an optical memory. The memory 630 is configured to store information. For example, the memory 630 is configured to store a computer program run by the processor 610.

Optionally, the data processing apparatus 600 may further include an input/output (I/O) interface (not shown in FIG. 11). The I/O interface is connected to the processor 610, the communications interface 620, and the memory 630. For example, the I/O interface may be a Universal Serial Bus (USB).

An embodiment of the present disclosure further provides a switching device. As shown in FIG. 1C, the switching device 02 may include the switching chip 02a, the CPU 02b, and the memory 02c. The memory 02c may store a computer program, and the CPU 02b may implement, by executing the computer program, the method described in step 111 or step 113 in the embodiment shown in FIG. 2A and FIG. 2B. A specific implementation process is not described herein again. The switching chip 02a may be configured to implement the method described in step 101, step 112, and step 114 in the embodiment shown in FIG. 2A and FIG. 2B, and a specific implementation process thereof is not described herein again.

An embodiment of the present disclosure further provides a data processing system. Referring to FIG. 1A, the system may include the controller 01, the plurality of computing nodes 02, and the at least one switching device 03.

The controller 01 may include the data processing apparatus shown in FIG. 7 or FIG. 11, and the data processing apparatus may include the sending module shown in FIG. 8 and the determining module shown in FIG. 9. Alternatively, the controller 01 may be the controller shown in FIG. 1D. Each switching device may include the data processing apparatus shown in FIG. 10, or each switching device may be the switching device shown in FIG. 1B or FIG. 1C.

An embodiment of the present disclosure provides a computer-readable storage medium. The computer-readable storage medium stores an instruction, and when the computer-readable storage medium is run on a computer, the computer is enabled to perform the data processing method provided in the foregoing method embodiments.

An embodiment of the present disclosure further provides a computer program product including an instruction. When the computer program product is run on a computer, the computer is enabled to perform the data processing method provided in the foregoing method embodiments.

What is claimed is:

1. A data processing method implemented by a controller in a data center network, wherein the data processing method comprises:
    receiving, from a first node of a plurality of computing nodes, a processing request for a calculation task, wherein the processing request comprises identifiers of the computing nodes that are configured to execute the calculation task;
    determining a target switching device from switching devices that are configured to couple to the computing nodes; and
    separately sending routing information corresponding to the calculation task to the target switching device and the first node, wherein the routing information indicates data forwarding paths between the computing nodes and the target switching device, and wherein the routing information enables the target switching device to send first combined data of the computing nodes to each of the computing nodes based on the routing information.

2. The data processing method of claim 1, wherein the data forwarding paths comprise at least one switching device, and wherein the data processing method further comprises:

determining, from the at least one switching device, an intermediate switching device coupled to at least two computing nodes among the computing nodes; and sending the routing information to the intermediate switching device to enable the intermediate switching device to send second combined data of the at least two computing nodes to the target switching device based on the routing information.

3. The data processing method of claim 2, further comprising:

sending second routing information comprising an identifier of a first directly coupled device of the target switching device to the target switching device, wherein the first directly coupled device is a second computing node or the intermediate switching device;

sending third routing information that comprises an identifier of a second directly coupled device of each of the computing nodes to the first node, wherein the second directly coupled device is the target switching device or the intermediate switching device, and wherein the third routing information enables the first node to send the identifier of the second directly coupled device to a corresponding computing node; and sending fourth routing information comprising an identifier of a third directly coupled device of the intermediate switching device to the intermediate switching device, wherein the third directly coupled device is a third computing node, the target switching device, or another intermediate switching device.

4. The data processing method of claim 1, further comprising:

separately calculating a sum of router hop counts between the computing nodes and each of the switching devices; and determining a switching device corresponding to a minimum sum of router hop counts as the target switching device.

5. The data processing method of claim 4, comprises, further comprising:

determining a performance parameter of each switching device that corresponds to the minimum sum of router hop counts when there is a plurality of second switching devices that correspond to the minimum sum of router hop counts, wherein the performance parameter comprises at least one of available bandwidth, computing load, a throughput, or a quantity of times for which the switching device is selected as the target switching device; and determining, from the second switching devices, a target switching device having a performance parameter that meets a preset condition.

6. The data processing method of claim 4, further comprising:

determining balance degrees of router hop counts between each switching device that corresponds to the minimum sum of router hop counts and the computing nodes wherein when there is a plurality of second switching devices that correspond to the minimum sum of router hop counts; and determining, from the second switching devices, a target switching device that corresponds to a highest balance degree of router hop counts.

7. The data processing method of claim 4, wherein before calculating the sum of router hop counts, the data processing method further comprises:

detecting whether the computing nodes are all directly coupled to a same switching device;

determining the same switching device as the target switching device when the computing nodes are all directly coupled to the same switching device; and calculating the sum of router hop counts when the computing nodes are directly coupled to different switching devices.

8. The data processing method of claim 1, further comprising:

determining at least one alternative switching device from the switching devices, wherein each alternative switching device of the at least one alternative switching device is coupled to at least two computing nodes among the computing nodes using downlink paths; and determining the target switching device from the at least one alternative switching device.

9. The data processing method of claim 1, wherein the processing request further comprises a combining type corresponding to the calculation task, and wherein the data processing method further comprises sending the combining type to the target switching device to enable the target switching device to combine, based on the combining type, the data.

10. A data processing apparatus of a controller in a data center network comprising:

a communications interface configured to:
receive, from a first node of a plurality of computing nodes, a processing request for a calculation task, wherein the processing request comprises identifiers of the computing nodes that are configured to execute the calculation task; and separately send first routing information corresponding to the calculation task to a target switching device and the first node, wherein the first routing information indicates data forwarding paths between the computing nodes and the target switching device, and wherein the first routing information enables the target switching device to send first combined data of the computing nodes to each of the computing nodes; and a processor coupled to the communications interface and configured to determine the target switching device from switching devices that are configured to couple to the computing nodes.

11. The data processing apparatus of claim 10, wherein the data forwarding paths comprise at least one switching device, wherein the processor is further configured to determine, from the at least one switching device, an intermediate switching device coupled to at least two computing nodes among the computing nodes, wherein the communications interface is further configured to send the first routing information to the intermediate switching device, wherein the first routing information enables the intermediate switching device to send second combined data of at least two of the computing nodes to the target switching device based on the routing information.

12. The data processing apparatus of claim 11, wherein the communications interface is configured to:
  send second routing information comprising an identifier of a first directly coupled device of the target switching device to the target switching device, wherein the first directly coupled device is a second computing node or the intermediate switching device;
  send third routing information comprising an identifier of a second directly coupled device of each of the computing nodes to the first node, wherein the second directly coupled device is the target switching device or the intermediate switching device, and wherein third routing information enables the first node to send the identifier of the second directly coupled device to a corresponding computing node; and
  send fourth routing information comprising an identifier of a third directly coupled device of the intermediate switching device to the intermediate switching device, wherein the third directly coupled device of the intermediate switching device is a third computing node, the target switching device, or another intermediate switching device.

13. The data processing apparatus of claim 10, wherein the processor is further configured to:
  calculate a sum of router hop counts between the computing nodes and each of the first switching devices; and
  determine a switching device that corresponds to a minimum sum of router hop counts as the target switching device.

14. The data processing apparatus of claim 13, wherein there is a plurality of second switching devices that corresponds to the minimum sum of router hop counts, and wherein the processor is further configured to:
  determine a performance parameter of each switching device of the second switching devices that corresponds to the minimum sum of router hop counts, wherein the performance parameter comprises at least one of available bandwidth, computing load, a throughput, or a quantity of times for which a corresponding switching device is selected as the target switching device; and
  determine, from the second switching devices, the target switching device having a performance parameter that meets a preset condition.

15. The data processing apparatus of claim 13, wherein there is a plurality of third switching devices that corresponds to the minimum sum of router hop counts, and wherein the processor is further configured to:
  determine balance degrees of router hop counts between each switching device that corresponds to the minimum sum of router hop counts and the computing nodes; and
  determine, from the third switching devices, the target switching device that corresponds to a highest balance degree of router hop counts.

16. The data processing apparatus of claim 13, wherein the processor is further configured to:
  detect whether the computing nodes are all directly coupled to a same switching device;
  determine the same switching device as the target switching device when the computing nodes are all directly coupled to the same switching device; and
  calculate the sum of router hop counts when the computing nodes are directly coupled to different switching devices.

17. A data processing apparatus of a switching device in a data center network, wherein the data processing apparatus comprises:
  a switching chip configured to:
  receive, from a controller, routing information that corresponds to a calculation task that is configured to be executable by a plurality of computing nodes, wherein the routing information indicates data forwarding paths between the computing nodes and a target switching device, and wherein the routing information is based on a processing request by a computing node for the calculation task; and a processor coupled to the switching chip and configured to:
  receive data from the computing nodes; and
  combine the data to obtain first combined data, and
  wherein the switching chip is further configured to send the first combined data based on the routing information.

18. The data processing apparatus of claim 17, wherein the switching chip is further configured to receive, from the controller before combining the data, a combining type that corresponds to the calculation task, and wherein the processor is further configured to combine, based on the combining type, the data to obtain the first combined data.

19. The data processing apparatus of claim 17, wherein the switching device is the target switching device, and wherein the switching chip is further configured to send the first combined data to each of the computing nodes based on the routing information.

20. The data processing apparatus of claim 17, wherein the switching device is an intermediate switching device that is configured for coupling to the target switching device and at least two of the computing nodes, wherein the processor is further configured to combine data of at least two of the computing nodes to obtain second combined data, and wherein the switching chip is further configured to send the second combined data to the target switching device based on the routing information.

* * * * *